United States Patent [19]
Neukermans et al.

[11] Patent Number: 6,044,705
[45] Date of Patent: *Apr. 4, 2000

[54] MICROMACHINED MEMBERS COUPLED FOR RELATIVE ROTATION BY TORSION BARS

[75] Inventors: Armand P. Neukermans, Palo Alto; Timothy G. Slater, San Francisco; Philip Downing, Saratoga, all of Calif.

[73] Assignee: Xros, Inc., Sunnyvale, Calif.

[ * ] Notice: This patent is subject to a terminal disclaimer.

[21] Appl. No.: 08/855,883

[22] Filed: May 12, 1997

Related U.S. Application Data

[63] Continuation-in-part of application No. 08/139,397, Oct. 18, 1993, Pat. No. 5,629,790, which is a continuation-in-part of application No. 08/595,042, Jan. 31, 1996, Pat. No. 5,648,618, which is a division of application No. 08/208,424, Mar. 8, 1994, Pat. No. 5,488,862.

[60] Provisional application No. 60/023,311, Jul. 31, 1996.

[51] Int. Cl.[7] .......................... G01C 19/00; G02B 26/08
[52] U.S. Cl. ........................... 73/504.02; 359/196
[58] Field of Search ............... 73/504.02, 504.12, 73/778, 814, 504.14; 257/418, 417, 415; 359/196–199, 201–203, 212–214, 223–226, 230

[56] References Cited

U.S. PATENT DOCUMENTS

| | | | |
|---|---|---|---|
| 3,471,641 | 10/1969 | Baker et al. | 178/7.6 |
| 3,614,312 | 10/1971 | Fournier et al. | 178/7.3 R |
| 3,762,791 | 10/1973 | Fournier et al. | 350/6 |
| 4,073,567 | 2/1978 | Lakerveld et al. | 350/6.5 |
| 4,230,393 | 10/1980 | Burke, Jr. | 350/6.5 |
| 4,317,611 | 3/1982 | Petersen | 350/6.6 |
| 4,441,791 | 4/1984 | Hornbeck | 350/360 |
| 4,468,282 | 8/1984 | Neukermans | 156/633 |
| 4,571,603 | 2/1986 | Hornbeck et al. | 346/160 |

(List continued on next page.)

FOREIGN PATENT DOCUMENTS

| | | | |
|---|---|---|---|
| 0834759 | 9/1997 | European Pat. Off. | G02B 26/08 |
| 9503562 | 2/1995 | WIPO | G02F 1/01 |
| 9801372 | 4/1998 | WIPO | G02B 26/12 |

OTHER PUBLICATIONS

Boxenhorn, B., et al., "Monolithic Silicon Accelerometer," *Sensors and Actuators*, A21–A23 (1990) pp. 273–277.

Breng, U., et al., "Electrostatic Micormechanic Actuators," *Journal of Micromechanics and Microengineering*, 2 (1992) pp. 256–261.

Buser, R.A., et al., "Very High Q–factor Resonators in Monocrystalline Silicon," *Sensors and Actuators*, A21–A23 (1990) pp. 323–327.

Diem, B., et al., "SOI (SIMOX) as a Substrate For Surface Micromachining of Single Crystalline Silicon Sensors and Actuators," *the 7th International Conference on Solid–State Sensors and Actuators*, (1993) pp. 233–236.

(List continued on next page.)

*Primary Examiner*—Richard A. Moller
*Attorney, Agent, or Firm*—Donald E. Schreiber

[57] ABSTRACT

Two torsion bars project from a reference member to support at least one plate or frame-shaped first dynamic member for rotation about an axis of the torsion bars. In one embodiment, a frame-shaped first dynamic member and a second pair of torsion bars, oriented non-parallel to the first torsion bars, support a second dynamic member for rotation about an axis that is collinear with the second pair of torsion bars. The vibrational frequency of the principal torsional vibrational mode of the dynamic members are respectively lower by at least 20% than the vibrational frequency of any other vibrational mode thereof. Either an electrostatic or electromagnetic drive means imparts rotary motion to the dynamic members about the collinear torsion bar axis(es). The reference member, the torsion bars and the dynamic member(s) are all monolithically fabricated from a stress-free semiconductor layer of a silicon substrate.

30 Claims, 13 Drawing Sheets

U.S. PATENT DOCUMENTS

| | | | |
|---|---|---|---|
| 4,598,585 | 7/1986 | Boxenhorn | 73/505 |
| 4,670,092 | 6/1987 | Motamedi | 156/643 |
| 4,699,006 | 10/1987 | Boxenhorn | 73/517 |
| 4,708,420 | 11/1987 | Liddiard | 350/6.6 |
| 4,710,732 | 12/1987 | Hornbeck | 332/7.51 |
| 4,732,440 | 3/1988 | Gadhok | 350/6.6 |
| 4,856,863 | 8/1989 | Sampsell et al. | 350/96.16 |
| 4,859,012 | 8/1989 | Cohn | 350/96.24 |
| 4,869,107 | 9/1989 | Murakami | 73/517 |
| 4,942,766 | 7/1990 | Greenwood et al. | 73/704 |
| 4,954,789 | 9/1990 | Sampsell | 330/4.3 |
| 4,956,619 | 9/1990 | Hornbeck | 330/4.3 |
| 4,991,964 | 2/1991 | Forgey et al. | 356/371 |
| 5,016,072 | 5/1991 | Greiff | 357/26 |
| 5,028,939 | 7/1991 | Hornbeck et al. | 346/160 |
| 5,037,173 | 8/1991 | Sampsell et al. | 385/17 |
| 5,097,354 | 3/1992 | Goto | 359/212 |
| 5,101,236 | 3/1992 | Nelson et al. | 355/229 |
| 5,111,693 | 5/1992 | Greiff | 73/514 |
| 5,142,303 | 8/1992 | Nelson | 346/108 |
| 5,155,778 | 10/1992 | Magel et al. | 385/18 |
| 5,196,714 | 3/1993 | Garcia Jr. et al. | 250/561 |
| 5,202,785 | 4/1993 | Nelson | 359/214 |
| 5,203,208 | 4/1993 | Bernstein | 73/505 |
| 5,212,582 | 5/1993 | Nelson | 359/224 |
| 5,220,835 | 6/1993 | Stephan | 73/517 R |
| 5,231,879 | 8/1993 | Yamamoto | 73/517 |
| 5,233,456 | 8/1993 | Nelson | 359/214 |
| 5,247,180 | 9/1993 | Mitcham et al. | 250/492.1 |
| 5,251,485 | 10/1993 | Kondo | 73/517 R |
| 5,256,869 | 10/1993 | Lin et al. | 250/201.9 |
| 5,260,596 | 11/1993 | Dunn et al. | 257/414 |
| 5,285,196 | 2/1994 | Gale | 345/108 |
| 5,291,473 | 3/1994 | Pauli | 369/112 |
| 5,331,852 | 7/1994 | Greiff et al. | 73/505 |
| 5,392,151 | 2/1995 | Nelson | 359/223 |
| 5,444,566 | 8/1995 | Gale et al. | 359/291 |
| 5,447,600 | 9/1995 | Webb | 216/2 |
| 5,452,024 | 9/1995 | Sampsell | 348/755 |
| 5,454,906 | 10/1995 | Baker | 216/66 |
| 5,457,566 | 10/1995 | Sampsell | 359/292 |
| 5,485,304 | 1/1996 | Kaeriyama | 359/291 |
| 5,491,680 | 2/1996 | Pauli | 369/112 |
| 5,508,841 | 4/1996 | Lin et al. | 359/318 |
| 5,532,997 | 7/1996 | Pauli | 369/112 |
| 5,535,047 | 7/1996 | Hornbeck | 359/295 |
| 5,552,924 | 9/1996 | Tregilgas | 359/224 |
| 5,563,398 | 10/1996 | Sampsell | 235/454 |
| 5,579,148 | 11/1996 | Nishikawa et al. | 359/214 |
| 5,579,151 | 11/1996 | Cho | 359/291 |
| 5,592,239 | 1/1997 | Hara et al. | 348/771 |
| 5,629,790 | 5/1997 | Neukermans et al. | 359/198 |
| 5,629,794 | 5/1997 | Magel et al. | 359/290 |
| 5,640,214 | 6/1997 | Florence | 348/743 |
| 5,654,741 | 8/1997 | Sampsell et al. | 345/158 |
| 5,661,591 | 8/1997 | Lin et al. | 359/290 |
| 5,665,997 | 9/1997 | Weaver | 257/414 |
| 5,671,083 | 9/1997 | Conner et al. | 359/291 |
| 5,673,139 | 9/1997 | Johnson | 359/291 |
| 5,682,174 | 10/1997 | Chiu | 345/84 |
| 5,696,619 | 12/1997 | Knipe et al. | 359/224 |
| 5,754,217 | 5/1998 | Allen | 347/239 |
| 5,771,116 | 6/1998 | Miller et al. | 359/295 |
| 5,774,604 | 6/1998 | McDonald | 385/18 |

OTHER PUBLICATIONS

Jaecklin, V.P., et al., "Mechanical and Optical properties of Surface Micromachined Torsional Mirrors in Silicon, Polysilicon and Aluminum", *The 7th International Conference on Solid–State Sensors and Actuators*, (1993) pp. 948–961.

Kleinman, R.n., et al., "Single–Crystal Silicon High–Q Torisional Oscillators, " *Rev. Sci. Instrum.* 56(11), Nov. 1985, pp. 2088–2091.

Pfann, W.G., et al., "Semiconducting Stress Transducers Utilizing the Transverse and Shear Piezoresistance Effects," *Journal of Applied Physics*, vol. 32, No. 10, (1961) pp. 2008–2016.

Wagner, B., et al., "Electromagnetic Microactuators with Multiple Degress of Freedom," *1991 International Conference on Solid–State Sensors and Actuators*, Digest of Technical Papers. (IEEE Cat No. 91CH2817–5) pp. 614–617.

Petersen, K., "Silicon Torsional Mirror," *Proceedings of the IEEE* vol. 70, No. 5 (1982), pp. 61–62.

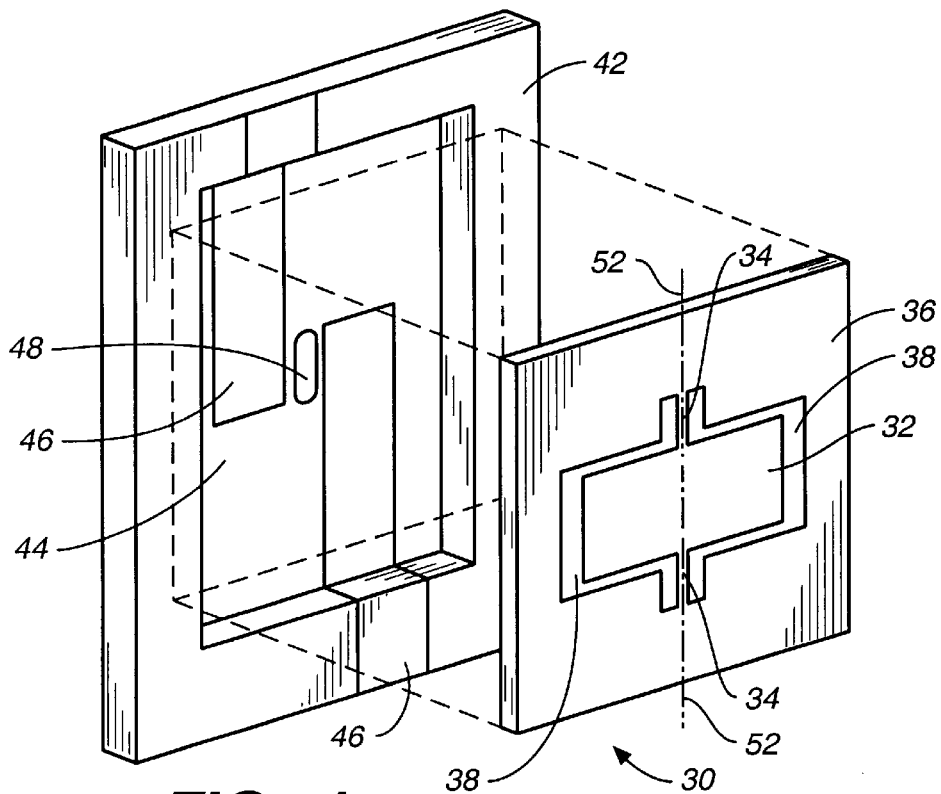
FIG._1
*(PRIOR ART)*
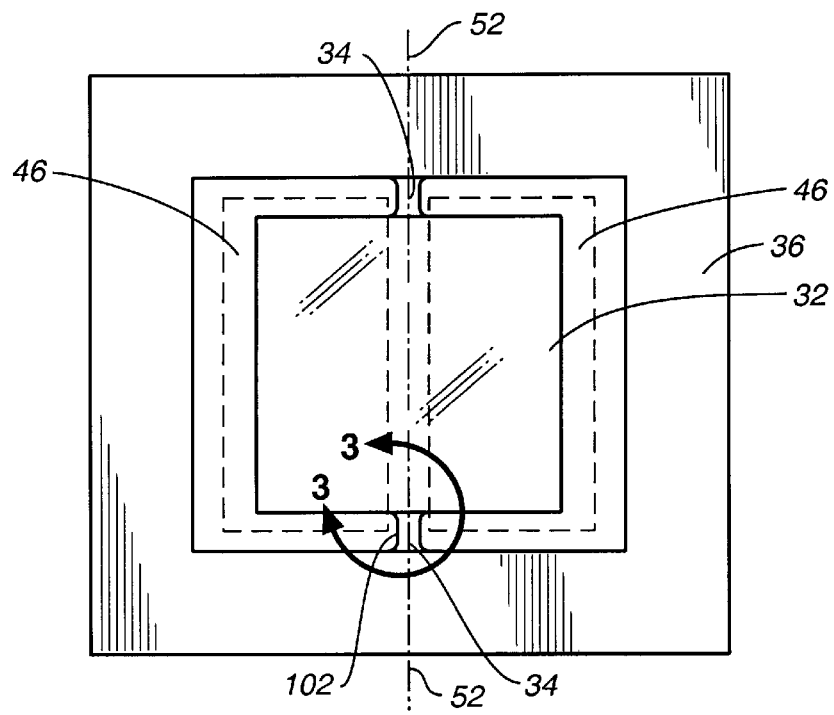
FIG._2

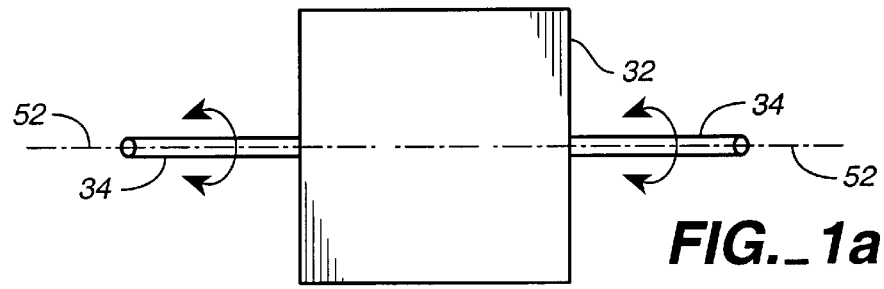
FIG._1a
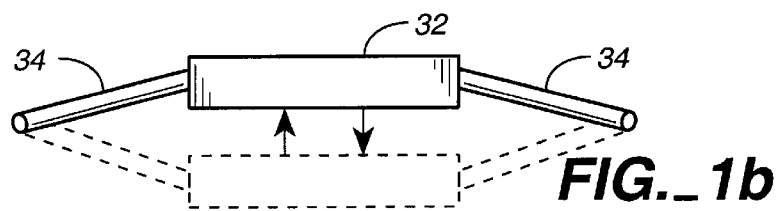
FIG._1b
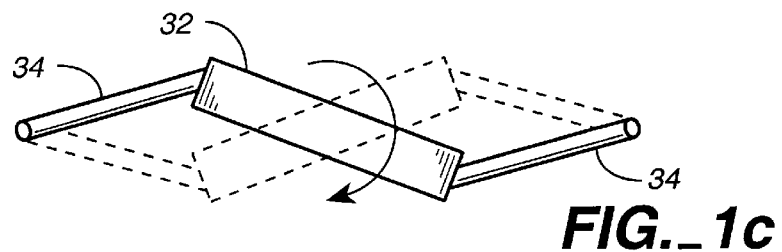
FIG._1c
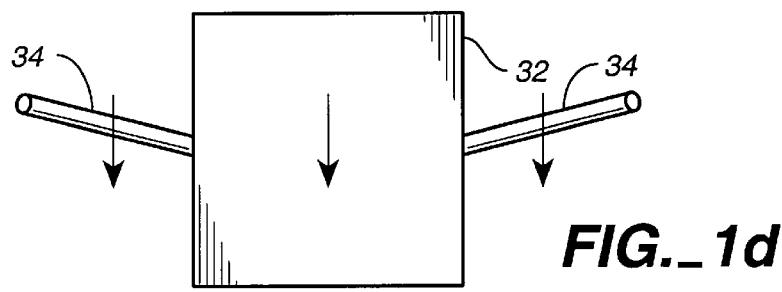
FIG._1d
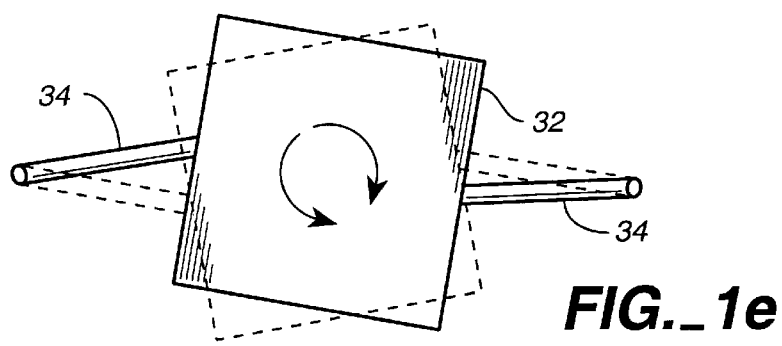
FIG._1e

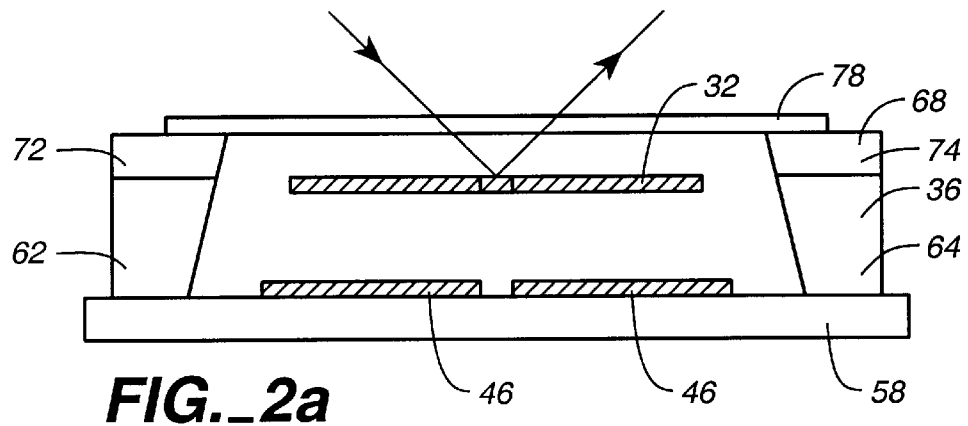
FIG._2a
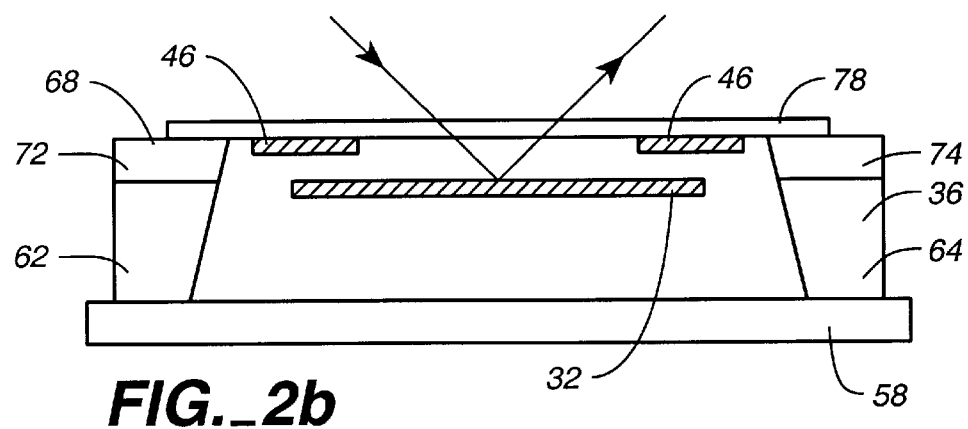
FIG._2b
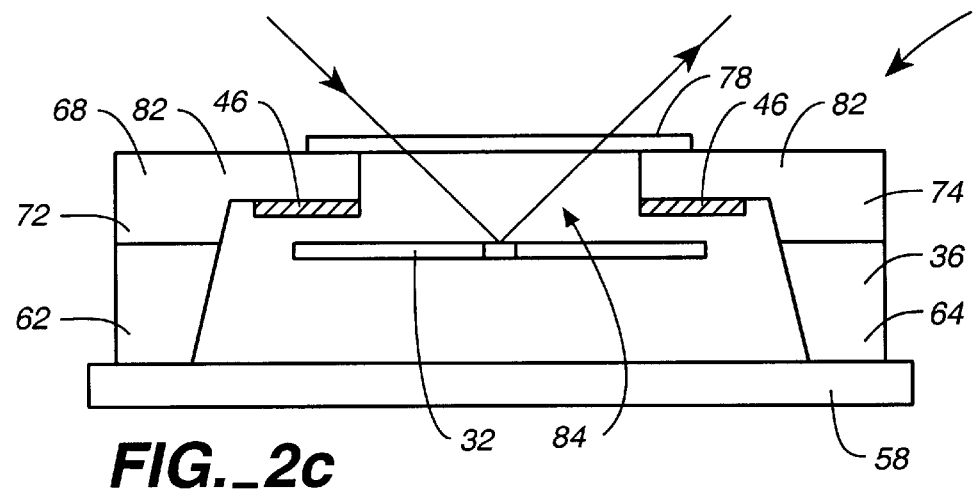
FIG._2c

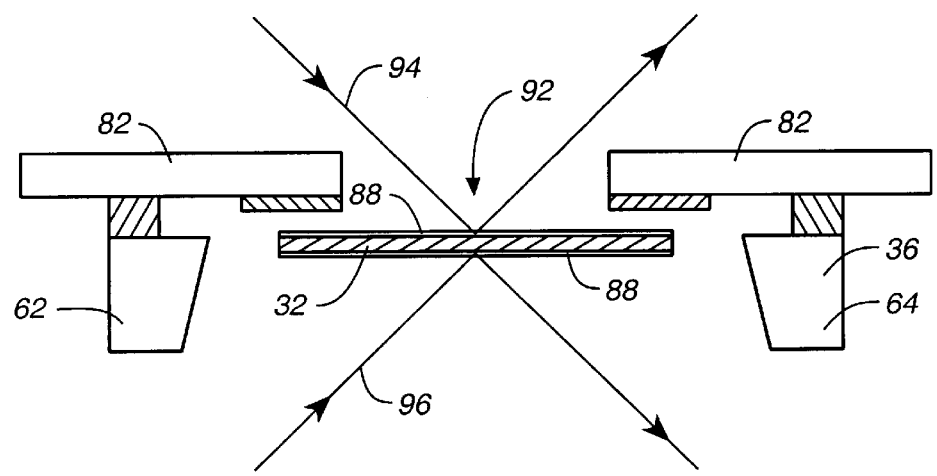
FIG._2d
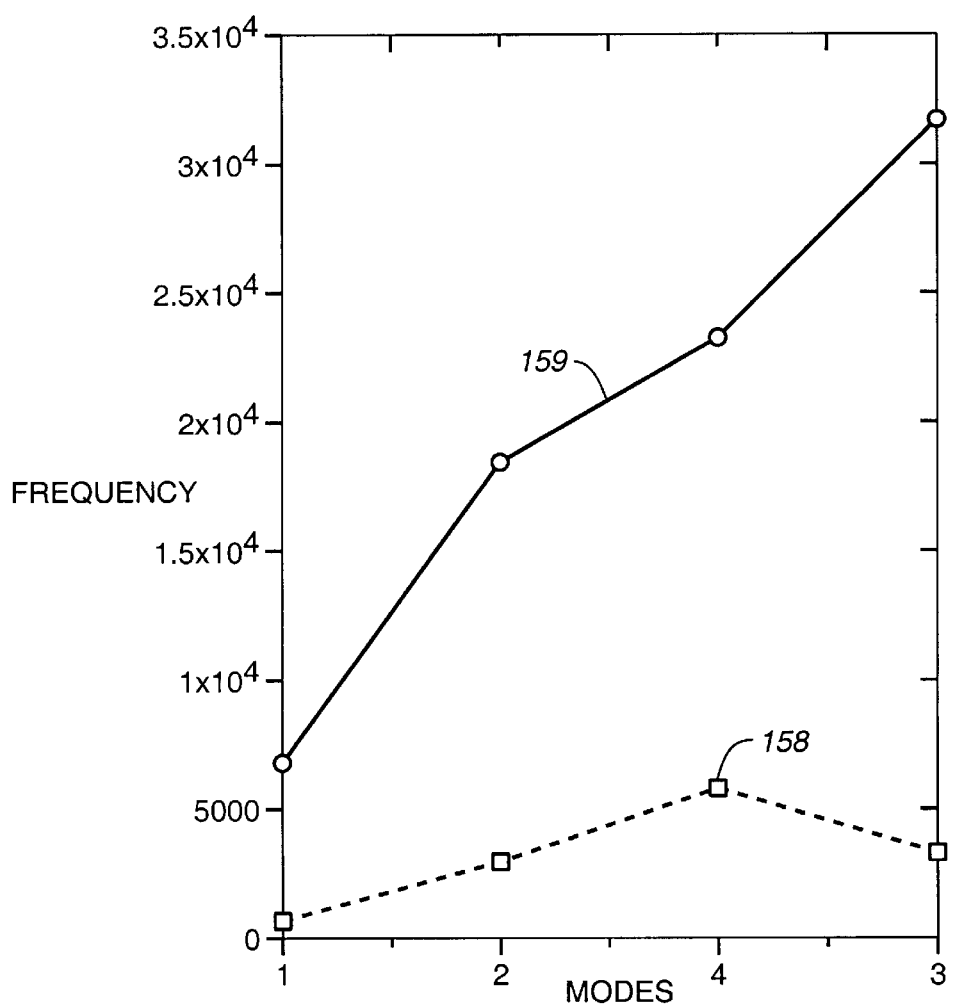
FIG._6

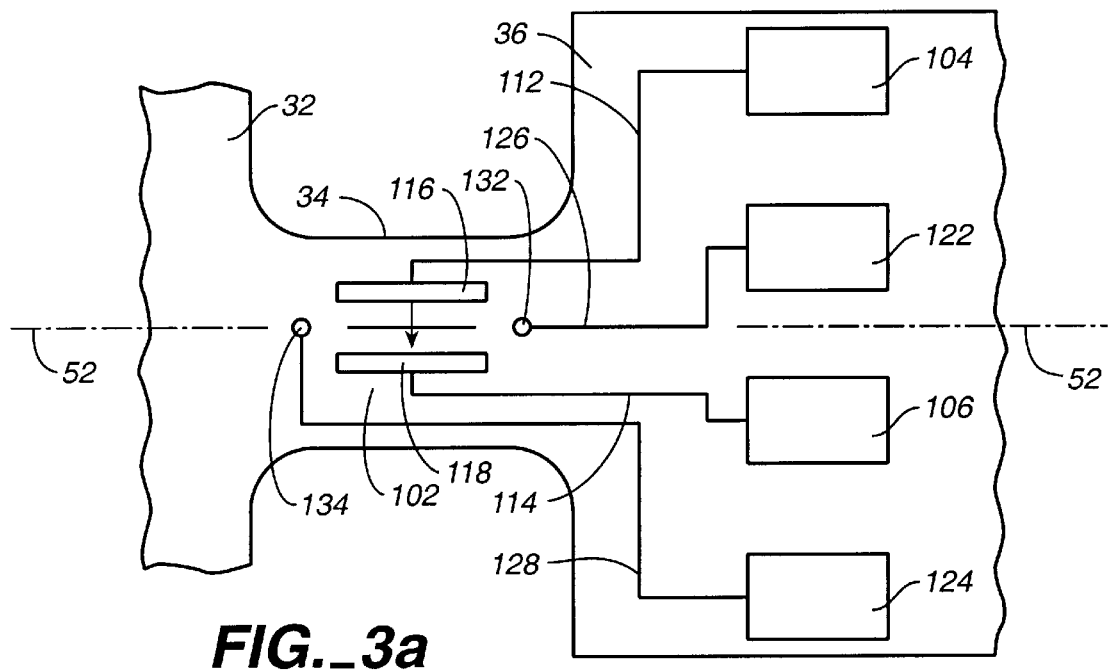
FIG._3a
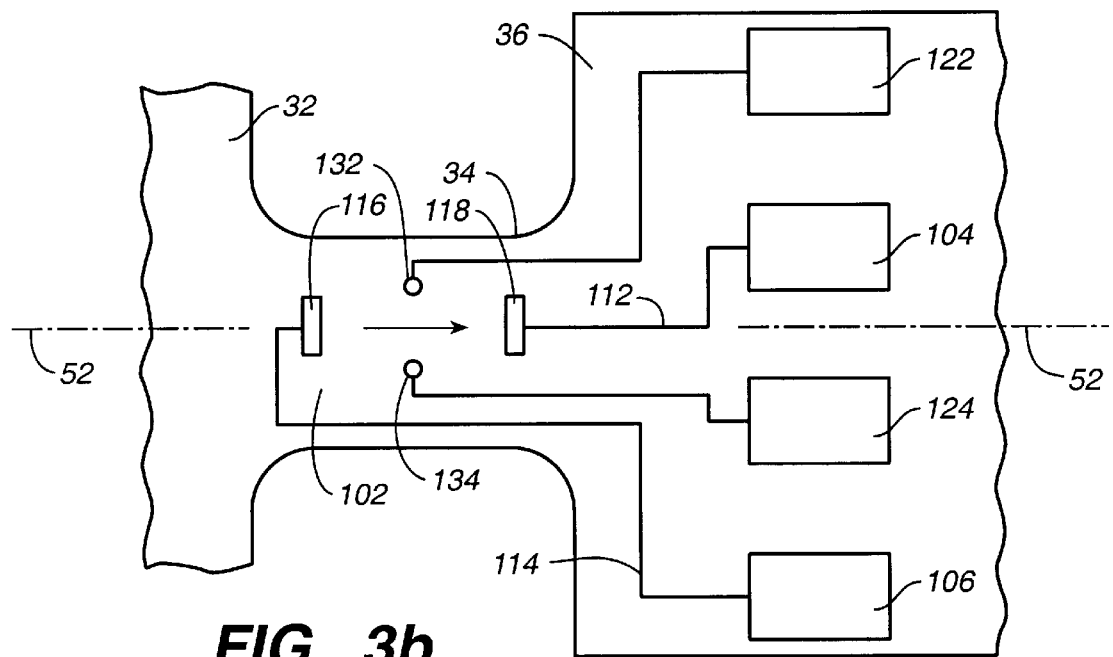
FIG._3b

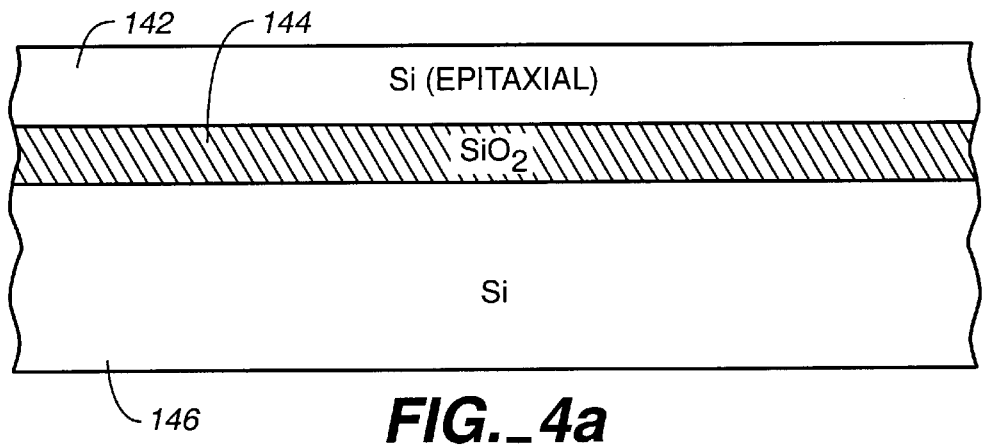
FIG._4a
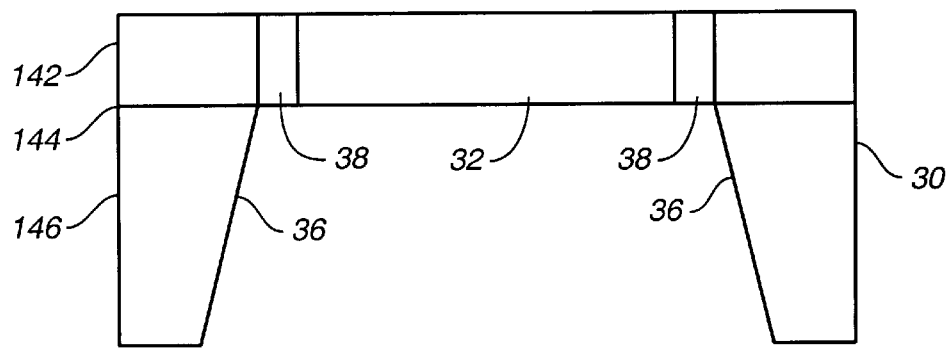
FIG._4b
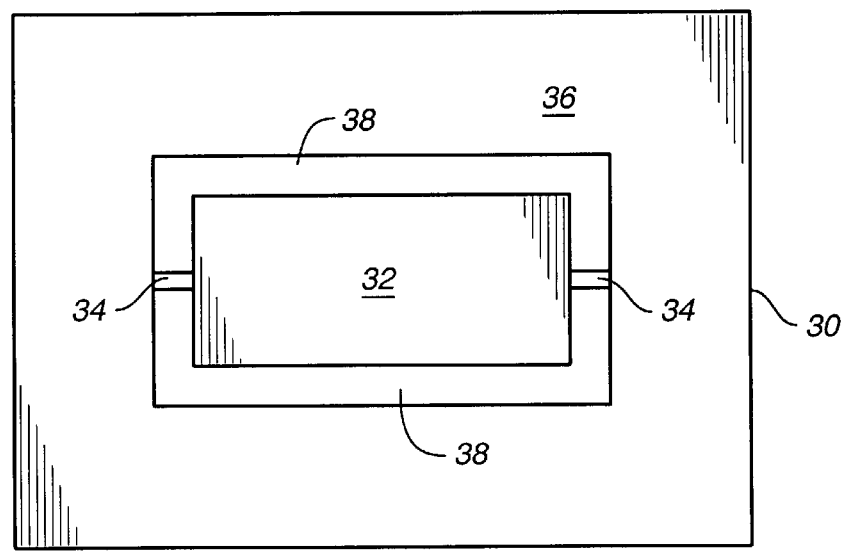
FIG._4c

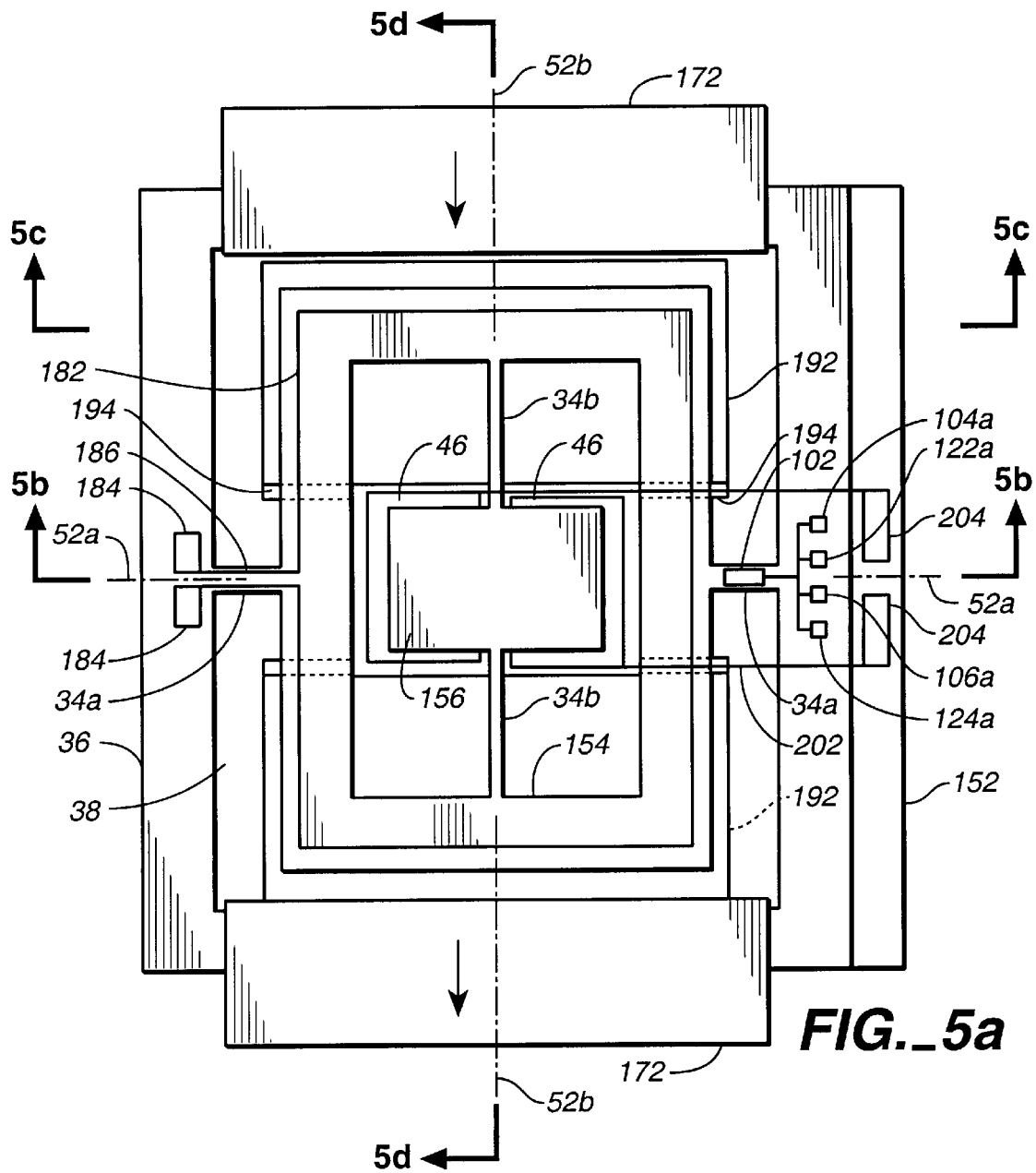
FIG._5a
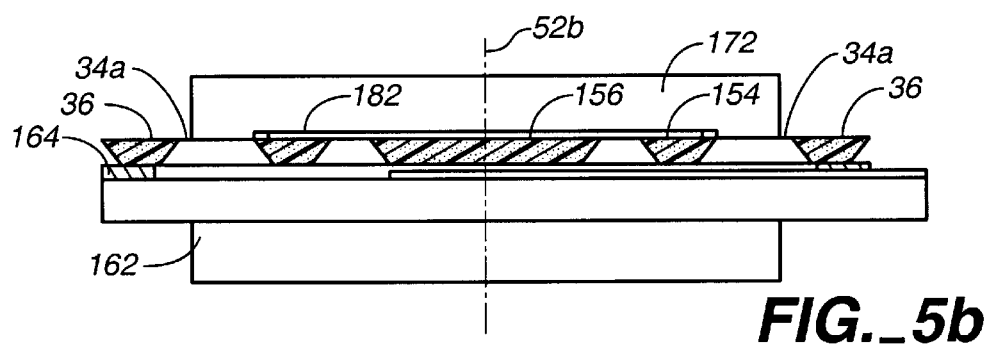
FIG._5b

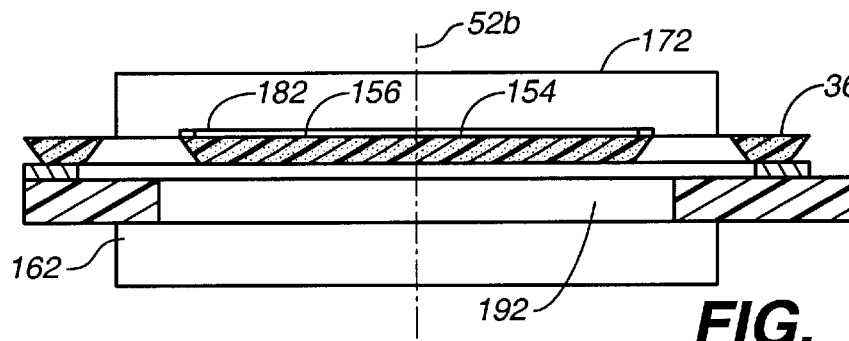
FIG._5c
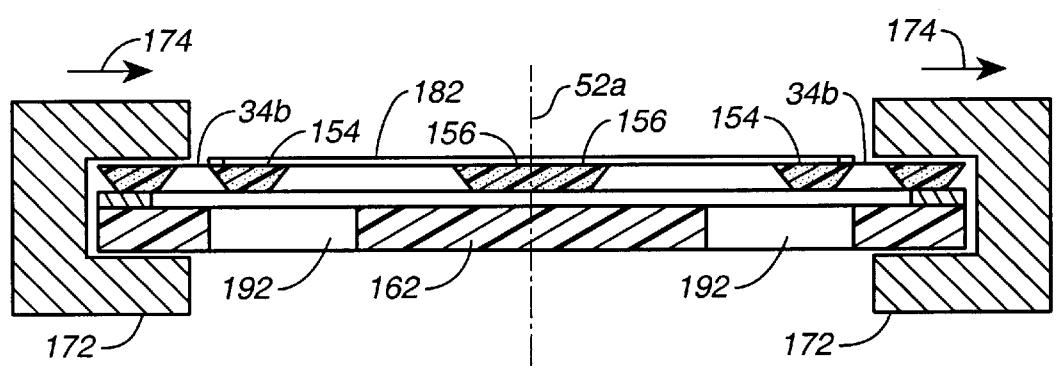
FIG._5d
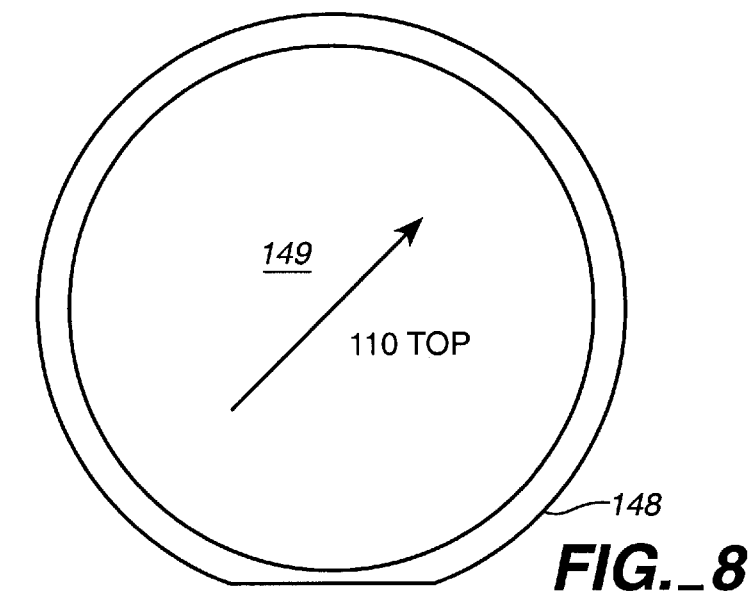
FIG._8

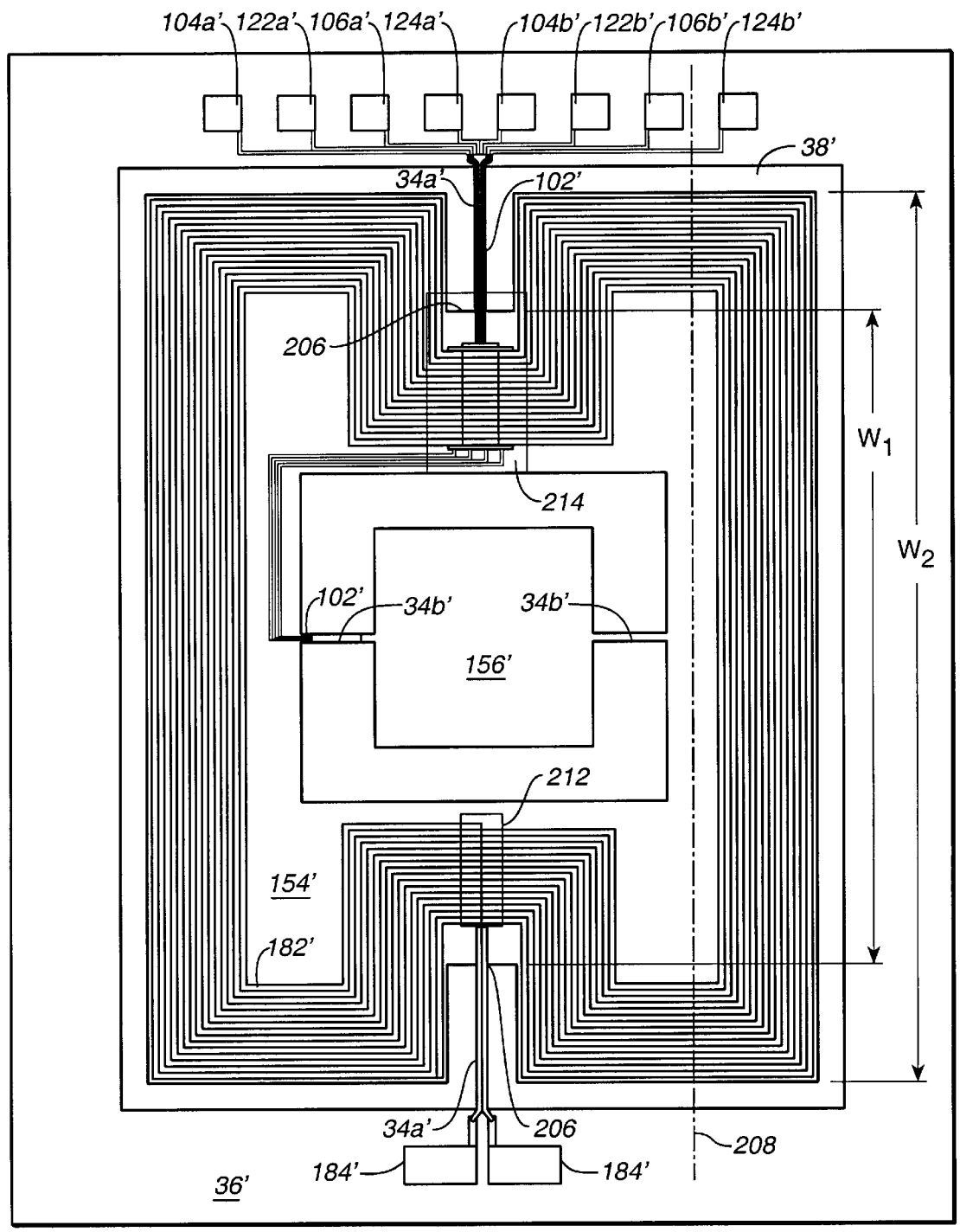
FIG._7

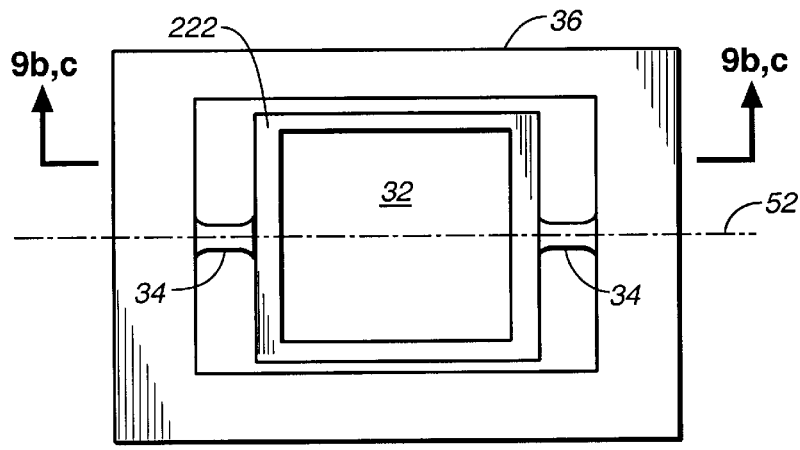
FIG._9a
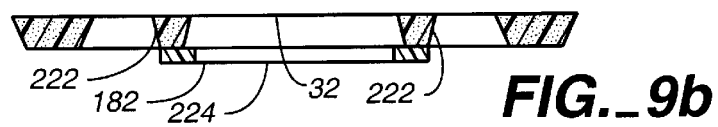
FIG._9b
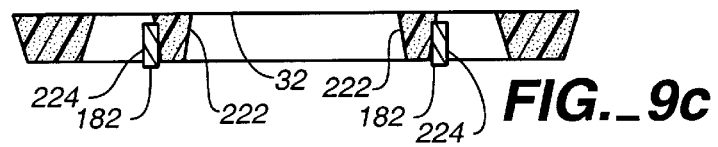
FIG._9c
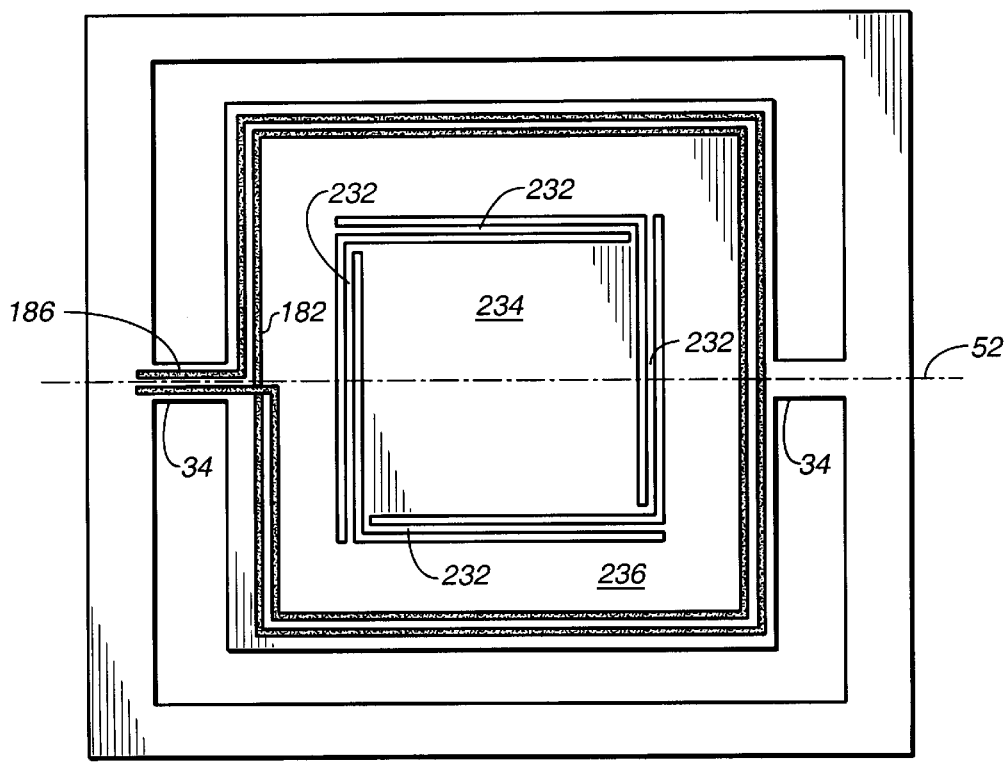
FIG._10

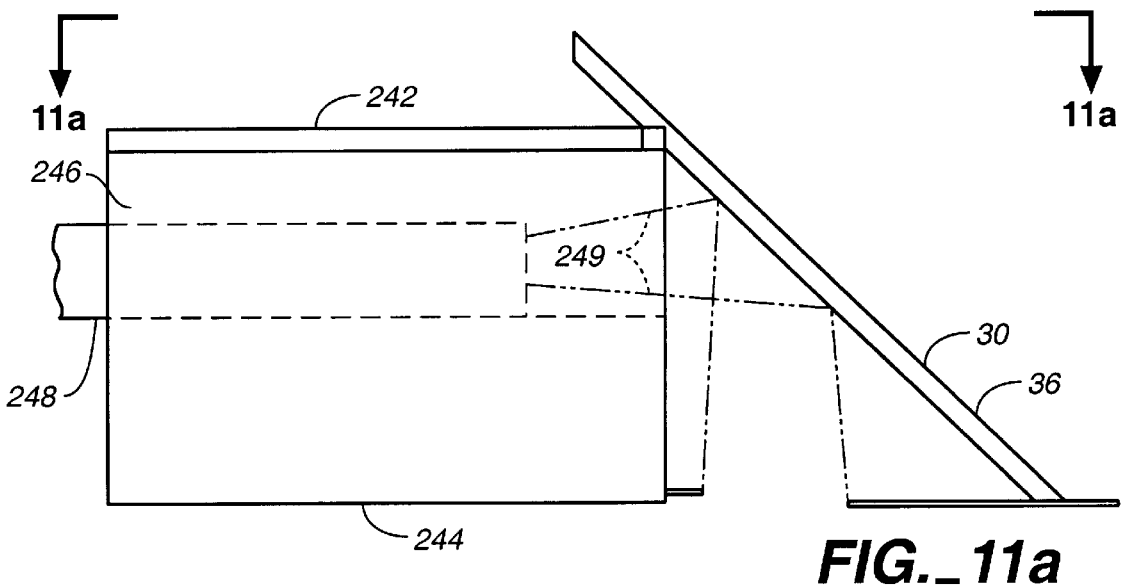
FIG._11a
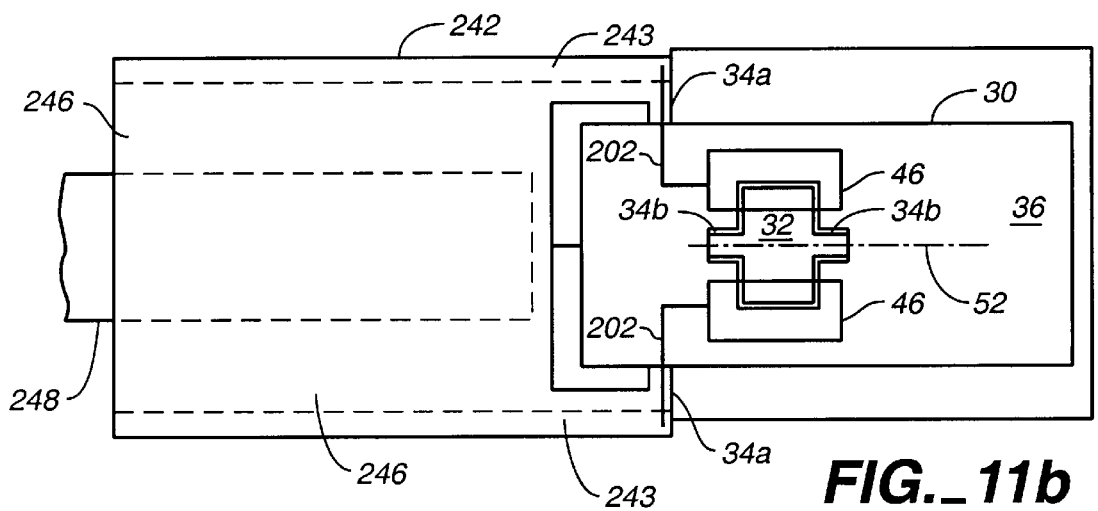
FIG._11b

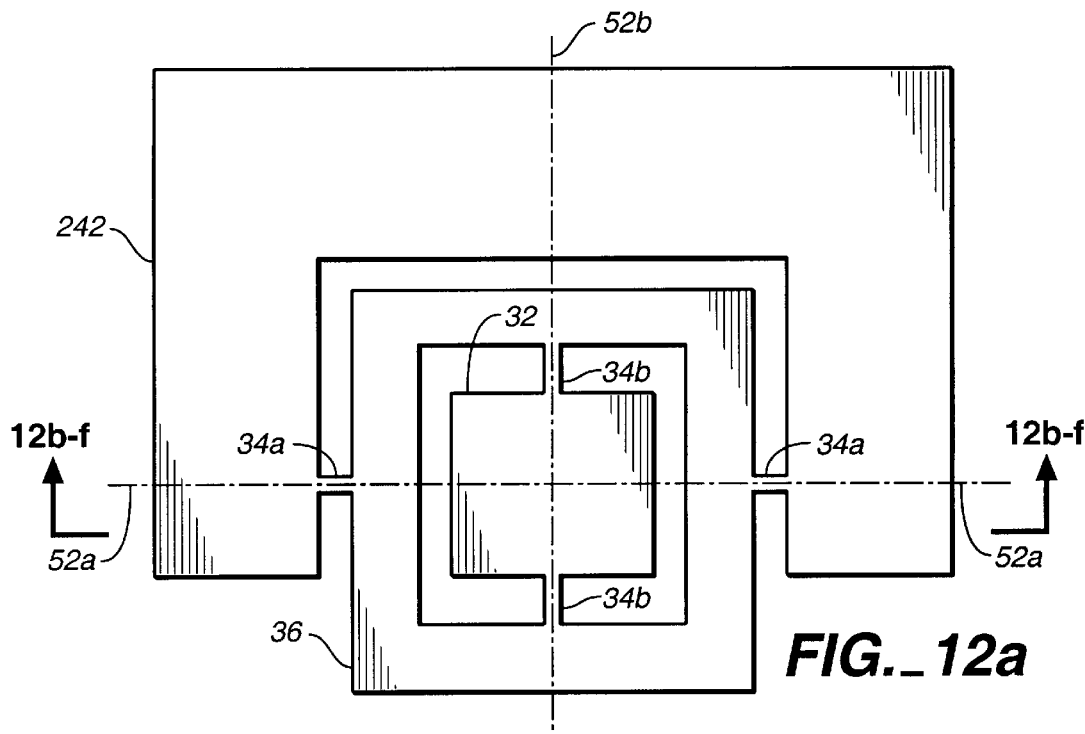
FIG._12a
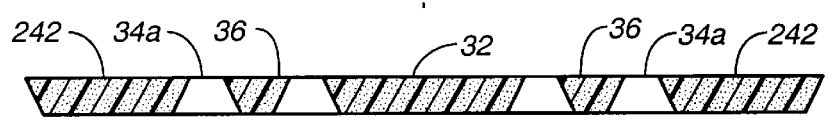
FIG._12b
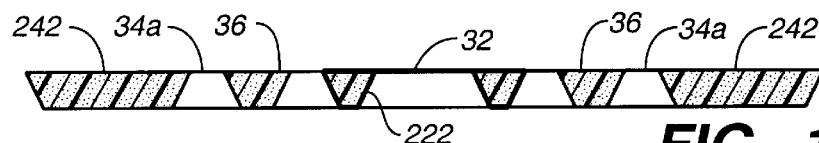
FIG._12c
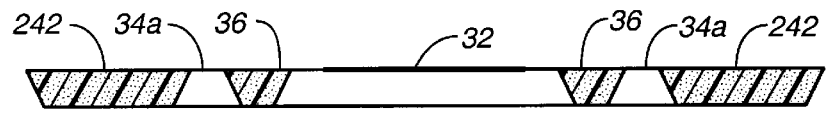
FIG._12d
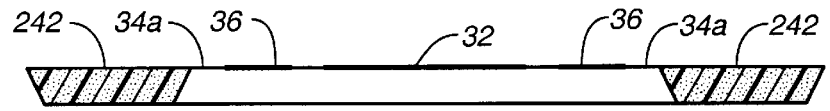
FIG._12e
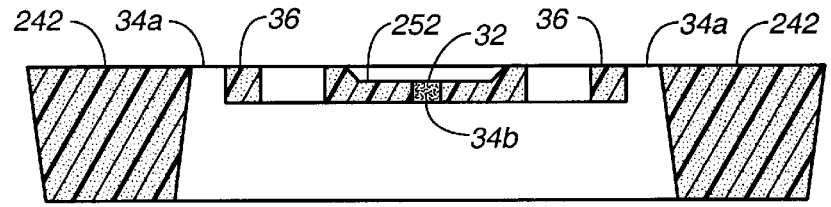
FIG._12f

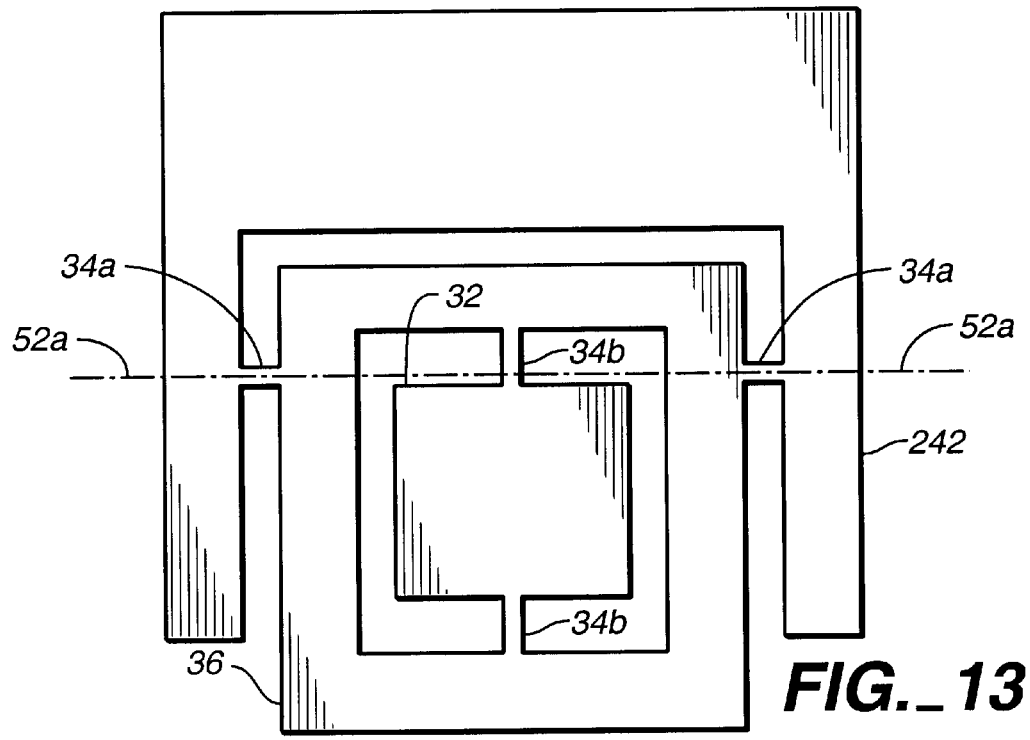
FIG._13
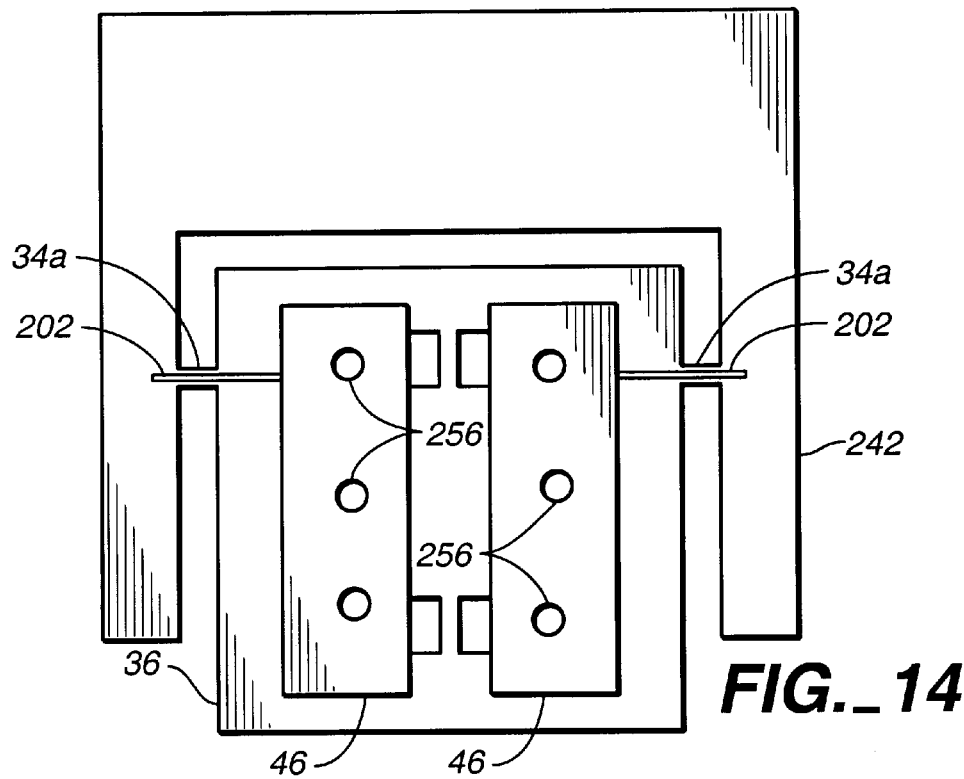
FIG._14

MICROMACHINED MEMBERS COUPLED FOR RELATIVE ROTATION BY TORSION BARS

RELATED U.S. APPLICATION DATA

This application is a Continuation-in-part of Ser. No. 08/139,397, filed Oct. 18, 1993, U.S. Pat. No. 5,629,790; which is a continuation-in-part of Ser. No. 08/595,042, filed Jan. 31, 1996, U.S. Pat. No. 5,648,618, which is a division of Ser. No. 08/208,424 filed Mar. 8, 1994, U.S. Pat. No. 5,488,862, which is also a continuation in part of Ser No. 08/139,397, filed Oct. 18, 1993, U.S. Pat. No. 5,629,790, and also claims the benefit of U.S. Provisional Patent Application No. 60/023,311 filed on Jul. 31, 1996.

BACKGROUND OF THE INVENTION

1. Field of the Invention

The invention relates generally to micromachined structures and, more particularly, to micromachined structures in which a first frame is coupled to a plate or to a second frame by diametrically opposed torsion bars that permit rotation of the plate or second frame with respect to the first frame about a longitudinal axis of the torsion bars.

2. Background Art

A fundamental micromachined structure having many diverse applications consists of a first frame that is coupled to a plate or to a second frame by diametrically opposed torsion bars extending between the first frame and the plate or second frame to permit rotation of the first frame and the plate with respect to the second frame about a longitudinal axis of the torsion bars. Practical uses for this micromachined structure include optical beam torsional scanners, gyroscopes, flow meters, and profilometer and/or atomic force microscope ("AFM") heads, etc.

An example of a practical application for this structure is optical beam torsional scanners that are used in digital imaging, printing, bar code reading, optical recording systems, surface inspection systems, and various other scientific and industrial systems. In general, optical beam torsional scanners deflect a beam of light, usually from a fixed light source, over an angle ranging from several degrees to tens of degrees. Such optical scanners sweep a beam of light back-and-forth at a frequency determined in part by a mechanical resonant frequency of a reflecting mirror included in the scanner. A typical micromachined optical beam torsional scanner of the prior art is described in U.S. Pat. No. 4,732,440 to J. Gadhok. The concept of micromachining torsional optical beam torsional scanners within a silicon body was proposed at an early date by K. Peterson, Proc. IEEE, vol. 70, no. 5, p. 61, May 1982 ("the Peterson article"). See also U.S. Pat. No. 4,317,611 to K. Peterson.

FIG. 1, depicting an optical beam torsional scanner 30 shown in FIG. 39 of the Peterson article, includes a micromachined, inner torsional mirror plate 32, coupled to and supported by diametrically opposed, axially aligned torsion bars 34 within a outer frame 36. The aforementioned article describes typical scanner parameters, such as the modulus of silicon, the typical wafer thickness, the length of the torsion bars 34 and the dimensions of the mirror plate 32. The Peterson article describes the width of the torsion bars 34 as approximately 500 micrometers, while the length of the torsion bars 34 is approximately 0.2 centimeters. The mirror plate 32 is approximately 0.22 centimeters along each edge. A gap 38 which isolates the mirror plate 32 from the frame 36, and which also defines the torsion bars 34, is approximately 0.02 centimeters wide. The Peterson article describes that the gap 38 is fabricated by anisotropically etching a silicon wafer substrate.

The Peterson article further discloses that the frame 36 rests on a glass substrate 42 into which a cavity 44 has been etched, and that electrodes 46 have been vapor deposited onto the substrate 42. A linear support ridge 48 projects upward out of the cavity 44 to support the mirror plate 32 between the torsion bars 34. A high electrical voltage from a drive circuit (not depicted in FIGS. 1 and 2) applied first to one electrode 46 then the other in a continuing out-of-phase sequence causes the mirror plate 32 to rotate back-and-forth around a longitudinal axis 52. The electric fields generated by the electrodes 46 tilts the mirror plate 32 first to one side and then the other. A restoring force from the torsion bars opposes such rotation of the mirror plate 32. Although air damping affects slightly the resonance frequency approximately calculated for the mirror plate 32, a mechanical resonant frequency for rotation of the mirror plate 32 about the longitudinal axis 52 of the torsion bar 34 can be calculated with well known formulas cited in the above-mentioned articles. The torsional scanner 30 disclosed in the Peterson article includes the substrate 42, electrode 46 and drive circuit.

Gyroscopes that sense a rate of rotation by sensing the effects of a Coriolis force on an oscillating body are widely used for various applications. Though lacking the precision of rotary gyros, the simplicity and relative cost of rate gyros makes them attractive. One example of an application for rate gyros is the automotive brake control system in which the rate of rotation of the car needs to be sensed and controlled to avoid a spin.

Present prices for rate gyros are excessively high for many potential mass market applications such as automotive brake systems, robotic control, patient monitoring, virtual reality simulation, video games, video camera image stabilization, etc. One approach for achieving such a price reduction is to apply semiconductor fabrication techniques for fabricating rate gyros.

Micromachined rate gyro sensors have been made previously. U.S. Pat. No. 4,598,585, by B. Boxenhorn, assigned to Draper Laboratory ("the Boxenhorn patent"), describes a micromachined planar inertial sensor, consisting of a pair of gimbals, positioned at right angles to each other. The inner gimbal plate carries a substantial mass, which acts as the gyroscopic resonator. A gimbal frame surrounds the mass of the inner gimbal plate noted as the y-axis in the patent to support the inner gimbal plate via interconnecting torsion bars. The gimbal frame surrounding the mass of the inner gimbal is driven by electrostatic forces, and oscillates in a torsion mode about a longitudinal axis of the torsion bars at a frequency equal to the mechanical resonance frequency of the inner gimbal. Rotation of the rate gyro around the z-axis excites the surrounding gimbal's oscillation at its resonance frequency, which a set of capacitive sensors on the surrounding gimbal detect. The method disclosed in the Boxenhorn patent is elegant in principle.

In other prior art devices it is suggested that the gimbals may be made out of many materials, such as silicon dioxide, nitride, oxy-nitrides, or even stamped steel or aluminum sheets. However, it is very difficult to produce such materials with the proper stress by deposition. As a consequence, in these prior art gyros the mechanical resonant frequency of the inner gimbal is not well controlled during fabrication, and must, therefore, be trimmed after fabrication to match the driving frequency of the surrounding gimbal. The materials proposed for such micromachined rate gyros are also subject to work hardening. Consequently, the resonant frequency of the inner gimbal changes over time, causing a mismatch with the resonant frequency of the surrounding gimbal, and an apparent loss of rate gyro sensitivity.

U.S. Pat. No. 4,699,006 by B. Boxenhorn discloses an oscillating digital integrating accelerometer, based on the same technology as that described above for the rate gyro. In the digital accelerometer application, a z-axis acceleration causes a change in the resonant frequency around the gyro's y-axis. The changes in frequency indicate z-axis acceleration.

U.S. Pat. No. 5,016,072 by Paul Greiff ("the Greiff patent") describes further improvements on the rate gyro structure disclosed in the Boxenhorn patent. The Greiff patent replaces dielectric layers disclosed in the Boxenhorn patent with a sheet of boron doped p+ silicon, and replaces the asymmetric mass of the Boxenhorn patent with a symmetric one. However, in the rate gyro disclosed in the Greiff patent buckling of the inner torsion bars causes undesirable large variations in the resonant frequency of the inner gimbal, and requires special torsion bar footings. The Greiff patent also requires grooves for the torsion bars to provide controllable stiffness. The boron doped silicon material requires stress relief and trimming of the torsion bars. Moreover, electrostatic force balancing techniques are needed to restrain motion of the inner gimbal, and to avoid cross-coupling between the inner and surrounding gimbal and changes of resonant frequency.

U.S. Pat. No. 5,203,208 by J. Bernstein ("the Bernstein patent") also assigned to Draper Lab, describes a symmetric micromechanical rate gyro, also using boron doped silicon. Here the mechanical resonance frequencies of both gimbals are designed to be the same, and trimmed to be identical. Trimming slots are also required in the gimbals to relieve stress in the boron doped silicon. Consequently, the rate gyro disclosed in the Bernstein patent requires vastly reduced drive voltage which substantially reduces parasitic pick-up signals.

Boxenhorn and Greiff in Sensors and Actuators, A21-A23 (1990) 273–277 (the Boxenhorn et al. article) describe an implementation of a silicon micromachined accelerometer of the type described in U.S. Pat. No. 4,598,585, mentioned above. The Boxenhorn et al. article again describes fabricating torsion bars from boron diffused silicon. The Boxenhorn et al. article ascribes difficulties encountered with this approach to unknown pre-stress, which sets the stiffness of the torsion bars and sensitivity of the device.

One of the problems encountered in prior art structures of the type described above is restricting oscillations of a frame or mirror plate 32 to a single desired torsional mode of rotation about the longitudinal axis 52. In all the processes for fabricating rate gyros described in the references identified above, stresses in the torsion bar material are uncontrolled, and the mechanical resonant frequencies unpredictable. Another deficiency in the prior art structures is sensing relative rotation about the longitudinal axis of diametrically opposed torsion bars that couple one frame or plate to a frame. Yet another difficulty with the prior art structures and fabrication methods is an inability to control, balance, or eliminate stress in micromachined plates or frames.

SUMMARY OF THE INVENTION

An object of the present invention is to provide a micromachined frame or plate which oscillates at a single desired mode of rotation about the longitudinal axis of torsion bars supporting the frame or plate.

Another object of the invention is to provide a micromachined frame or plate that is self self-oscillating about the longitudinal axis of torsion bars supporting the frame or plate at the frame or plate's mechanical resonant frequency.

Yet another object of the present invention is to facilitate sensing relative rotation between a micromachined frame and frame or plate about a longitudinal axis of diametrically opposed torsion bars coupling the frame to the plate or frame.

Another object of the present invention is to provide micromachined plates and frames coupled to each other by diametrically opposed stress free torsion bars.

Another object of the present invention is to provide optically flat micromachined plates and frames coupled to each other by diametrically opposed torsion bars.

Another object of the present invention is to provide a mechanically rugged micromachined structure in which diametrically opposed torsion bars couple a frame to a plate or frame for oscillation about the longitudinal axis of torsion bars supporting the frame or plate.

Another object of the present invention is to provide less expensive structures in which frame or plate oscillates at a single desired mode of rotation about the longitudinal axis of torsion bars supporting the frame or plate.

Another object of the present invention is to provide smaller structures in which frame or plate oscillates at a single desired mode of rotation about the longitudinal axis of torsion bars supporting the frame or plate.

Briefly, the present invention is an integrated, micromachined structure that includes a reference member that, depending upon a particular application, may take the form of either a frame or a plate. A first pair of diametrically opposed, axially aligned torsion bars are coupled to and project from the reference member. The structure also includes at least a first dynamic member that is coupled by the torsion bars to the reference member, and that, depending upon a particular application, may take the form of either a plate or a frame. The first pair of torsion bars support the first dynamic member for rotation about an axis that is collinear with the torsion bars. The reference member, the torsion bars and the first dynamic member are all monolithically fabricated from a stress-free semiconductor layer of a silicon substrate.

The first dynamic member thus supported within the reference member by the torsion bars has a center, defines a dynamic member rest plane if no external force is applied to the dynamic member, and exhibits a plurality of vibrational modes including a principal torsional vibrational mode about the axis that is collinear with the torsion bars. In addition to the principal torsional vibrational mode, the first dynamic member also exhibits a vertical shaking vibrational mode, a vertical rocking vibrational mode, a lateral shaking vibrational mode, and a lateral rocking vibrational mode. Each vibrational mode of the dynamic member has a vibrational frequency. The first dynamic member and the first pair of torsion bars are designed so the vibrational frequency of the principal torsional vibrational mode is lower by at least 20% than the vibrational frequency of any other vibrational mode of the first dynamic member.

The integrated, micromachined structure further includes a first drive means for imparting rotary motion to the dynamic member about the axis that is collinear with the torsion bars. In one embodiment of the present invention, the first drive means uses electrostatic force to impart rotary motion to the dynamic member. In an alternative embodiment of the invention, the first drive means uses electromagnetic force to impart rotary motion to the dynamic member.

In one embodiment of the structure, the first dynamic member itself includes a frame from which project a second pair of diametrically opposed, axially aligned torsion bars that are oriented non-parallel to the first pair of torsion bars. The first dynamic member also includes a second dynamic member that is coupled by the second pair of torsion bars to the first dynamic member, and that, depending upon a particular application, may take the form of either a plate or a frame. The second pair of torsion bars support the second dynamic member for rotation about an axis that is collinear with the second pair of torsion bars. The second pair of torsion bars and the second dynamic member are all monolithically fabricated from the silicon substrate together with the reference member, the first pair of torsion bars and the first dynamic member.

The second dynamic member thus supported within the first dynamic member by the second pair of torsion bars has a center, defines a dynamic member rest plane if no external force is applied to the dynamic member, and exhibits a plurality of vibrational modes including a principal torsional vibrational mode about the axis that is collinear with the second pair of torsion bars. In addition to the principal torsional vibrational mode, the second dynamic member also exhibits a vertical shaking vibrational mode, a vertical rocking vibrational mode, a lateral shaking vibrational mode, and a lateral rocking vibrational mode. Each vibrational mode of the second dynamic member has a vibrational frequency. The second dynamic member and the second pair of torsion bars are designed so the vibrational frequency of the vibrational frequency of the principal torsional vibrational mode of the second dynamic member is lower by at least 20% than the vibrational frequency of any other vibrational mode of the second dynamic member.

In some applications, this embodiment of the structure may also include a second drive means for imparting rotary motion to the second dynamic member about the axis that is collinear with the second pair of torsion bars. In one particular embodiment, the second drive means employs electrostatic force for imparting rotary motion to the second dynamic member while the first drive means employs electromagnetic force for imparting rotary motion to the first dynamic member.

In another embodiment of the structure the reference member is coupled to and supported from a supporting member by a second pair of diametrically opposed, axially aligned torsion bars that project from the supporting member. The second pair of torsion bars and the supporting member are all monolithically fabricated from the silicon substrate together with the reference member, the first pair of torsion bars and the first dynamic member. The second pair of torsion bars permit the reference member to be mechanically rotated about an axis that is collinear with the second pair of torsion bars, and to be locked in a pre-established position. In this way the dynamic member coupled to the reference member is disposed at a pre-established angle with respect to the supporting member.

These and other features, objects and advantages will be understood or apparent to those of ordinary skill in the art from the following detailed description of the preferred embodiment as illustrated in the various drawing figures.

BRIEF DESCRIPTION OF THE DRAWINGS

FIG. 1 is a perspective assembly view of a micromachined optical beam torsional scanner of the prior art;

FIGS. 1a–1e illustrate various vibrational modes for a plate supported by torsion bars;

FIG. 2 is a top view of a torsional scanner in accordance with the present invention illustrating a reference member frame, torsion bars, and a dynamic member mirror plate all monolithically fabricated from a stress-free semiconductor layer of a silicon substrate;

FIGS. 2a, 2b, 2c and 2d are side plan views of alternative torsional scanners in accordance with the present invention;

FIGS. 3a and 3b are plan views taken along the line 3—3 in FIG. 2 showing an enlargement of a torsion bar including a torsion sensor;

FIG. 4a is a partial cutaway elevational view of a silicon-on-insulator wafer that may be used for fabricating devices of the present invention;

FIG. 4b is elevational view of that relates portions of the torsional scanner to layers of the Simox wafer illustrated in FIG. 4a;

FIG. 4c is a top plan view of the torsional scanner illustrated in FIG. 4b;

FIG. 5a a plan view of a 2D torsional scanner micromachined from silicon adapted for deflecting the beam of light to form a 2D raster;

FIG. 5b a cross-sectional elevational view of the 2D micromachined torsional scanner taken along the line 5b—5b of FIG. 5a;

FIG. 5c a cross-sectional elevational view of the 2D micromachined torsional scanner taken along the line 5c—5c of FIG. 5a;

FIG. 5d a cross-sectional elevational view of the 2D micromachined torsional scanner taken along the line 5d—5d of FIG. 5a;

FIG. 6 is a plot showing a ratio of mode frequencies for a 2D torsional scanner such as that depicted in FIGS. 5a–5d showing a mode separation required for each of the two dynamic members included in the 2D torsional scanner, and between the two dynamic members;

FIG. 7 is a plan view of the presently preferred embodiment of a 2D scanner micromachined from silicon for deflecting a beam of light to form a 2D raster;

FIG. 8 is a plan view depicting two silicon wafers oriented for bonding with different crystallographic axes aligned;

FIG. 9a is a plan view depicting the torsional scanner for which the substrate about the center of mass of the mirror plate is mostly etched away producing a box frame structure;

FIG. 9b is a cross-sectional elevational view of the 2D micromachined torsional scanner taken along the line 9b/c—9b/c of FIG. 9a illustrating installation of an appliqué coil for a magnetic drive;

FIG. 9c is a cross-sectional elevational view of the 2D micromachined torsional scanner taken along the line 9b/c—9b/c of FIG. 9a illustrating installation of a vertical appliqué coil for a magnetic drive;

FIG. 10 is a plan view depicting a torsional scanner having a mirror plate that includes flexures to ensure a stress free central region on the mirror plate;

FIG. 11a is an elevational view depicting a support structure for the torsional scanner bonded onto a silicon block to permit mechanically adjusting the torsional scanner's orientation with respect to the silicon block and optical components carried therein;

FIG. 11b is a plan view depicting the support structure and silicon block taken along the line 11b—11b in FIG. 11a;

FIG. 12a is a plan view depicting the support structure depicted in FIG. 11a and 11b coupled to a torsional scanner;

FIGS. 12b–12f are a cross-sectional elevational view depicting various possible configurations for the torsional scanner coupled to the support structure taken along the line 12/b/c/d/e/f—12/b/c/d/e/f of FIG. 12a; and FIG. 13 is a plan view depicting the support structure of FIGS. 11a, 11b and 12a–f with torsion bars supporting the torsional scanner that have a longitudinal axis which does not pass through the center of the mirror plate thus providing displacement of the mirror plate illustrated in FIG. 11a; and FIG. 14 is a plan view depicting the support structure of FIG. 13 with electrodes positioned adjacent to the mirror plate and supported from the frame.

DETAILED DESCRIPTION OF THE PREFERRED EMBODIMENTS

FIGS. 1a–1e, illustrate various vibrational modes of an integrated, micromachined torsional scanner 30 such as that depicted in FIG. 1. FIG. 1a depicts a top view of a desired or principal torsional vibrational mode of a torsional scanner 30. This mode is designated as mode 1 herein. The mirror plate 32 has opposed torsion bars 34 which permit rotation of the mirror plate 32 about the longitudinal axis 52 in the directions shown by the arrows. In FIG. 1b, a vertical shaking mode is shown in a side view wherein the mirror plate 32 is moving up and down in the directions shown by the upward and downward pointing arrows. This mode is designated as mode 2 herein.

FIG. 1c shows the mirror plate 32 in a vertical rocking mode in which the mirror plate 32 also twists out of a horizontal support plane at the ends of the mirror plate 32, but not at the center. This is herein designated as mode 3. FIG. 1d shows a lateral shaking mode where the mirror plate 32 moves first in one direction, then in an opposite direction within the support plane. This will be termed mode 4 herein. FIG. 1e shows a lateral rocking mode in which the mirror plate 32 twists back-and-forth in opposite directions within the horizontal support plane. This will be termed mode 5 herein.

Modes 2–5 are undesired, but cannot be completely eliminated. Other modes, called plate modes, are possible but for most applications, the frequency of plate modes are much higher and would be removed if separation is achieved with respect to the modes which have been illustrated. More complex modes are also possible, again usually at higher frequencies.

A micromachined structure in accordance with the present invention separates the vibrational frequencies of modes 2–5 from the vibrational frequency of the principal torsional vibrational mode 1 by a minimum frequency ratio. By maintaining an adequate separation between the principal torsional vibrational mode and the next higher mode, less energy is transferred to the undesired modes 2–5. For a typical configuration of a torsional scanner 30 in accordance with the present invention, the frequencies of the various modes are shown in the following table:

TABLE 1

| | Vibrational Frequency (Hz) | | | |
|---|---|---|---|---|
| | Mode 1 | Mode 2 | Mode 3 | Mode 4 |
| High Freq | 14,100 | 71,400 | 123,000 | 214,000 |
| Mid Freq | 1,500 | 3,200 | 5,500 | 15,900 |

TABLE 1-continued

| | Vibrational Frequency (Hz) | | | |
|---|---|---|---|---|
| | Mode 1 | Mode 2 | Mode 3 | Mode 4 |
| Low Freq | 92 | 930 | 1,600 | 18,500 |

In general the separations described above for the principal torsional vibrational mode at any given frequency range are achieved by designing the torsion bars 34 as thin and narrow as possible, yet adequately thick to withstand impact forces in the environment in which the torsional scanner 30 is used. While two identically shaped torsion bars 34 usually couple the mirror plate 32 to the frame 36, the torsion bars 34 may, in fact, be asymmetric with one having a different length or width from the other.

When driving a micromachined mirror plate 32, certain forces described below are applied asymmetrically to the mirror plate 32. For example, spaced apart electrodes 46 can drive one-half of the mirror plate 32 and then at a later time the other half. On the other hand, other driving forces, such as magnetic forces, apply a symmetric driving couple to the mirror plate 32. If symmetric driving forces are applied to the mirror plate 32, the vibrational frequency of the principal torsional vibrational mode may be closer to the undesired modes 2–5, perhaps within twenty percent. However, if asymmetric driving forces are applied to the mirror plate 32, the separation between the undesired modes 2–5 and the principal torsional vibrational mode should be at least thirty percent.

Configurations for Torsional Scanner 30

FIG. 2 depicts the frame 36 of the torsional scanner 30 micromachined from a silicon substrate that is also etched to define the mirror plate 32. The mirror plate 32 is supported within the larger frame 36 by torsion bars 34. The reference member frame 36, the torsion bars 34, and the dynamic member mirror plate 32 are all monolithically fabricated from a stress-free semiconductor layer of a silicon substrate. The surface of the smaller mirror plate 32 is polished in the manner of commercial silicon wafers so that it has a shiny, reflective surface.

Supported either below or above the mirror plate 32 and slightly spaced therefrom are the electrodes 46, indicated by dashed lines. During operation of the torsional scanner 30, the electrodes 46 are alternately charged by voltages which generate electric fields that attract the smaller mirror plate 32 which is electrically grounded through the torsion bars 34 to the surrounding larger frame 36. Note that there is no fulcrum or backplane support required for the torsional scanner depicted in FIG. 2 as is required for the torsional scanner 30 depicted in FIG. 1. Only the torsion bars 34 provide support for the mirror plate 32 within the frame 36. Apart from the requirement that the vibrational frequency of the principal torsional vibrational mode be lower by at least 20% than any of the undesired modes 2–5 which permits eliminating the fulcrum or backplane support, the overall design of the torsional scanner 30 of the present invention, up to this point, may be in accord with the prior art. However, in a torsional scanner 30 in accordance with the present invention the mass of the mirror plate 32 and the dimensions of the torsion bars 34 and perhaps other variables are selected so that the principal torsional vibrational mode is well separated from the undesired modes 2–5.

The cross-sectional view of FIG. 2a depicts electrodes 46 supported on an insulating glass substrate 58. The frame 36 has opposite sides 62 and 64 which contact the glass substrate 58. The mirror plate 32 is supported by the torsion bars 34 (not illustrated in FIG. 2a) from the larger silicon frame 36 at a location spaced above the electrodes 46. Above the sides 62 and 64, a second frame 68 having opposite edges 72 and 74 rests on the frame 36. If a sealed housing is desired for the torsional scanner 30, the opposite edges 72 and 74 supports a vapor deposited very thin membrane window 78 (or any transparent window).

The entire structure depicted in FIG. 2a is fabricated using semiconductor processing techniques. The electrodes 46 are metal stripes vapor deposited onto the glass substrate 58 that are then patterned on a silicon dioxide coating on the glass substrate 58 using standard photolithographic techniques. The frame 36 having sides 131 and 133, the torsion bars 34, and the integral mirror plate 32 are separately fabricated by anisotropically etching a silicon wafer. The micromachined silicon housing provided by the second frame 68 and the membrane window 78 described above is preferred, but not necessary. A conventional box with a transparent top could also be used. The membrane window 78 is made sufficiently tough to permit depositing transparent electrodes 46 directly onto the membrane. As depicted in FIG. 2b, such electrodes 46 may be provided by very thin indium tin oxide stripes deposited on membrane window 78. The electrodes 46 deposited on the membrane window 78 need be only a few molecular layers thick because the electrodes 46 conduct very little current.

The thickness of the mirror plate 32 may be equal to the thickness of the silicon substrate, or less. For high vibrational frequency operation of the torsional scanner 30, the thickness of the mirror plate 32 is typically a fraction of the substrate thickness. The thickness of the mirror plate 32 may range from less than one micron to tens of microns. A desirable method for fabricating the torsional scanner 30 uses a Simox wafer, or similar wafers, e.g. a silicon-on-insulator substrate, where the thickness of the mirror plate 32 is determined by an epitaxial layer. As compared to metals or polysilicon, single crystal silicon is preferred both for the mirror plate 32 and for the torsion bars 34 because of its superior strength and fatigue characteristics. For low vibrational frequency operation of the torsional scanner 30, typically below 100 Hz, if the thickness of the mirror plate 32 were to equal only that of the substrate's epitaxial layer, then the length of the torsion bars 34 makes them too fragile to withstand liquid processing or shock within their working environments. Therefore, the full thickness of the substrate's epitaxial layer should be used to form the mirror plate 32 for low vibrational frequency operation. The torsion bars 34 are therefore much broader and shorter, but their thickness would still equal the epitaxial layer's thickness. However, the mirror plate 32 would be much thicker equaling the total thickness of the substrate. The substrate about the center of mass of the mirror plate 32 can be mostly etched away producing a box frame structure. Forming a mirror plate 32 having a box frame structure affects the mechanical resonance frequency or moment of inertia of the mirror plate 32 very little, but reduces the mass of the mirror plate 32, and hence the forces on the torsion bars 34.

After fabricating the torsional scanner 30, the light transmissive membrane window 78 is mounted over the mirror plate 32. This is done by taking a second silicon wafer and vapor depositing a thin layer of silicon nitride, silicon carbide or boron nitride over the wafer and then etching away the supporting substrate down to the thin vapor deposited layer. A thin layer of Silicon could also be used for the membrane window 78. The opposite edges 72 and 74 of the second frame 68 are joined to sides 62 and 64 of the frame 36. The two congruent wafer sections may be joined by a variety of processes such as anodic bonding, silicon to silicon bonding, solder glasses, etc. all done in a vacuum environment. Enclosing the torsional scanner 30 in this way permits evacuating the closed container. The method of manufacturing the thin membrane window 78 is described in U.S. Pat. No. 4,468,282 to A. Neukermans. The patent describes thin films having a thickness in the range of a few microns. The area of the window for a torsional scanner 30 would be about 3 mm×3 mm. An advantage of the thin film membrane window 78 is that it eliminates optical aberrations. The film selected for the membrane window 78 should be substantially transmissive of light, with little absorption so that the film will not be damaged by an incident laser beam.

Providing a vacuum container for the mirror plate 32 eliminates damping due to air, and the mirror plate 32 will oscillate to frequencies up to several tens of thousand hertz. Again, it should be noted that a vacuum enclosure is not necessary, but helps greatly in reducing the voltage needed for electrostatic drive, as well as for magnetic drive. Large electrostatic voltages needed to drive the mirror plate 32 in a normal atmospheric environment attract particles to the surface of the mirror plate 32. Because the micromachined mirror plate 32 is difficult to clean, a dust cover is preferable. Thus, in a non-vacuum environment the membrane window 78 serves as a dust cover for the mirror plate 32.

The construction of the torsional scanner 30 depicted in FIG. 2c is similar to that depicted in FIG. 2a. Again, the second frame 68 includes a vapor deposited thin film membrane window 78. However, in FIG. 2c the second frame 68 includes a wall 82 that is pierced by an etched opening 84 below the membrane window 78. The wall 82 overhangs mirror plate 32 and has electrodes 46 deposited on the underside of the wall 82 facing mirror plate 32. As previously described, the electrodes 46 are conductive material that is vapor deposited once the wall 82 has been formed by etching a second substrate, and an oxide coating has been applied thereto. The electrodes 46 perform the same function as previously, rotating the mirror plate 32 by electrostatic force generated by alternate high voltages applied to the electrodes 46. Because the wall 82 overhangs the mirror plate 32, the opening 84 will not be as large as the opening provided in FIG. 2a where the mirror drive force is applied to the rear of the mirror plate 32. Auxiliary electrodes, similar to those depicted in FIG. 2a but not depicted in FIGS. 2c or 2d, may be placed below the mirror plate 32 in FIGS. 2b and 2c so that electrodes are both above and below the mirror plate 32. Driving signals are then synchronized between electrodes located above and below the mirror plate 32 so that diagonally located electrodes both concurrently pull on the mirror plate 32. Symmetric pulling by electrodes located both above and below the mirror plate 32 strengthen the oscillating force applied to the mirror plate 32, and assists in driving the mirror plate 32 at its principal torsional vibrational mode because of symmetry.

The mirror plate 32 depicted in FIG. 2d includes a reflective mirror coating 88 on both a front side and a back side of the mirror plate 32. The reflective mirror coating 88 is formed by first coating one side of the mirror plate 32 with an adhesive laye of a material such as chromium having a thickness such as 40 A° followed by a thicker reflective metallic layer such as 400 A° of gold. After one side has been coated, the other side receives an idetical coating deposited under identical conditions to produce compensating, balancing stresses leaving the mirror plate 32 flat.

The membrane window 78 has a central opening 92 which admits a beam of light 94 directed toward a front side of the mirror plate 32 at a center of rotation of the mirror plate 32. Another beam of light 96 is directed to a back side of the mirror plate 32 also at the center of rotation. In this manner, both front and back sides of the mirror plate 32 can concurrently scan different beams of light.

Sensor in Torsion Bar 34

To permit continuously sensing the angular position of the mirror plate 32 with respect to the frame 36, one of the torsion bars 34 that supports the mirror plate 32 within the frame 36 preferably includes a torsion sensor 102. Alternative embodiments for the torsion sensor 102 are respectively depicted in FIG. 3a and 3b. The torsion sensor 102 is preferably constructed in accordance with the description set forth both in U.S. Pat. No. 5,488,863 entitled "Monolithic Silicon Rate-Gyro With Integrated Sensors" that issued Feb. 6, 1996 ("the Rate Gyro patent"), and in U.S. Pat. No. 5,629,790 entitled "Micromachined Torsional Scanner" that issued May 13, 1997, ("the Torsional Scanner patent"). Both the Rate Gyro patent and the Torsional Scanner patent are hereby incorporated by reference. The preferred torsion sensor 102 is of the four terminal type depicted in FIGS. 3a and 3b, and is similar to the type described by Pfann et al., but optimized here for the torsion bar 34. See "Semiconducting Stress Transducers utilizing the Transverse and Shear Piezo Resistance Effects", W. G. Pfann and R. N. Thurston, Journ. Appl. Phys., Vol. 32, 10, pg. 2008, 1961. An electric current applied to the torsion sensor 102 through current pads 104 and 106 and leads 112 and 114 flows across the torsion bar 34 between current electrodes 116 and 118 perpendicular to the longitudinal axis 52. An output voltage from the torsion sensor 102 appears across output pads 122 and 124 that are electrically connected via leads 126 and 128 to output electrodes 132 and 134. The current pads 104 and 106 and the output pads 122 and 124 and leads 112, 114, 126 and 128 connecting them respectively to the current electrodes 116 and 118 and to the output electrodes 132 and 134 are electrically insulated from the torsion bar 34 and the frame 36.

Torsion of the torsion bar 34 produces a change in the voltage between output electrodes 132 and 134. For torsion of the torsion bar 34, the stresses present are pure shear stresses, oriented parallel to the direction of electrical current flow indicated by an arrow in FIG. 3a. The electric field generated in the direction perpendicular to current flow is given by the expression:

$$E = i\rho\sigma\pi$$

where

E is the field, i the current density, $\rho$ the nominal resistivity of the material, $\sigma$ the shear stress, and $\pi$ the relevant element of the piezoresistive tensor in the particular direction.

By orienting the torsion sensor 102 as illustrated in FIG. 3a, with current flowing perpendicular to the length of the torsion bar 34, the current section can be made as long as is desirable, and the generated voltage, which is the integral of the field, should increase linearly with the length of the current section. In principle the generated voltage could exceed the applied voltage present across the current electrodes 116 and 118. However, in practice shorting between the current electrodes 116 and 118 limits the voltage produced at the output electrodes 132 and 134 to less than the voltage applied across the current electrodes 116 and 118. In this preferred arrangement, the geometry of the torsion sensor 102 matches perfectly the geometry of the torsion bar 34.

Another orientation for the torsion sensor 102 with electrodes 116–118 and 132–134, rotated 90° from that depicted in FIG. 3a, is illustrated in FIG. 3b. In the illustration of FIG. 3b, electric current supplied to the torsion sensor 102 through current pads 104 and 106 and the leads 112 and 114 flows parallel to the longitudinal axis 52 between current electrodes 116 and 118. An output voltage from the torsion sensor 102 again appears across output pads 122 and 124 that are electrically connected to output electrodes 132 and 134 by leads 126 and 128. Again, the current pads 104 and 106 and the output pads 122 and 124 and leads 112, 114, 126 and 128 connecting them respectively to the current electrodes 116 and 118 and to the output electrodes 132 and 134 are electrically insulated from the torsion bar 34 and the frame 36.

The electric field generated within the torsion sensor 102 is given by the same expression as that for the torsion sensor 102 depicted in FIG. 3a, but the width of current flow for the embodiment depicted in FIG. 3b is now restricted to the width of the torsion bar 34. The only way to increase the voltage in the alternative embodiment depicted in FIG. 3b is to increase the voltage applied across the current pads 104 and 106. Note also that the first orientation of the torsion sensor 102 is also advantageous for another reason: the leads 112 and 114 supplying current to the torsion sensor 102 are usually quite broad, and therefore leave little room to bring out the voltage sensing leads 126 and 128, if such lines are oriented as depicted in FIG. 3b. If the torsion bar 34 is under considerable shear stress, then it is advantageous to locate the current carrying lines at the edge of the torsion bar 34, where the shear stress is zero, as this reduces metal fatigue.

Silicon ("Si"), in the proper orientation, is extremely sensitive to shear, more so than to any other stress. For a <100> orientation of the Si wafer surface, which is the preferred orientation for most micromachining, the highest shear sensitivities are obtained with the torsion bar 34 oriented in the <100> direction for p-type silicon, and in the <110> direction for n-type silicon. The piezo-resistance coefficients of Si are almost independent of doping, until the resistivity reaches a value on the order of 0.01 ohm-cm. Note that the output of the torsion sensor 102 is independent of any linear stresses or bending of the torsion bar 34. Instead of four (4) contact points (2 for current, 2 for voltage) for the torsion sensor 102, the number can be reduced to 3 using one current injection electrode and two symmetrically placed current pickup electrodes.

The piezo voltage described above is a bulk effect. However, in many torsion bars 34 of interest the thickness of the torsion bar 34 is usually less than the width of the torsion bar 34. Since the shear stress reverses sign on the other face of the torsion bar 34, the generated voltages also reverse sign. If the current were uniform throughout the thickness of the torsion bar 34, the piezo voltage effects would then tend to cancel each other. Therefore the applied current must be restricted to one half of the torsion bar 34, a location where the shear stress always has the same sign. In practice it is preferable to restrict the current to the top few microns of the torsion bar 34, as the stress is largest there, and to reduce the power dissipation in the torsion sensor 102. Restricting the current to the surface of the torsion bar 34 can be achieved by preferential heavy doping of the top few microns (n-type in n-type material), or by junction isolation (e.g., making an n-type well in a p-type substrate). The latter technique has the advantage that the torsion sensor 102 is electrically no longer part of the torsion bar 34 and the associated structures, but is now junction isolated and therefore much less sensitive to the driving voltage pickup.

To avoid DC offsets etc. and interfering noise cause by driving voltages applied across the mirror plate 32 and the electrodes 46, the current applied to the torsion sensor 102 can be AC, usually at a frequency higher than the mechanical resonant frequency of the mirror plate 32. The torsion in the torsion bar 34 then appears in the voltage across the output pads 122 and 124 as amplitude modulation of a carrier signal having the frequency of the applied AC current. The amplitude modulation can be readily demodulated to obtain the desired output signal from the torsion sensor 102. Reversing the direction of torsion stress in the torsion bar 34 reverses the signal of the amplitude modulation. In addition to sensing rotation of the mirror plate 32 about the longitudinal axis 52, if so desired the output signal from the torsion sensor 102 may be used in a positive feedback scheme for driving the mirror plate 32 at its mechanical resonant frequency, or may be used to measure rotation along the torsion bar 34 in a galvanometric drive of the mirror plate 32, or both.

Fabricating Torsional Scanner 30

Silicon-on-insulator wafers are preferred as a substrate if fabrication tolerances are critical for the torsional scanner 30 or other similar structure in which a dynamic member is supported by torsion bars from a reference member. What such critical fabrication processes require is a layer of high quality, stress free silicon separated from the bulk by a suitable etch stop layer. Since the epitaxial silicon deposition forms a uniform thickness layer, the thickness of the torsion bars 34, determined by the thickness of the epitaxial layer, are very uniform over the wafer's surface. Uniform thickness for the torsion bars 34 is critical to obtaining a uniform vibrational frequency for the principal torsional vibrational mode for all the devices on a wafer.

If the torsion bars 34 are fabricated using the silicon-on-insulator material Simox, they are virtually stress free, and of very high quality. Similarly, when using a Simox substrate the mirror plate 32 and the frame 36 do not curl because they too are virtually stress free which is very important in many applications, particularly optical applications. Simox wafers of the type illustrated in FIG. 4a include a single crystal silicon device layer 142, that is from a fraction of a micron to tens of microns thick, grown on top of an oxide layer 144, which is typically several thousands of Angstroms thick. The oxide layer 144 sits on top of the bulk of the silicon wafer 146. Silicon-on-insulator structures other than Simox that have an equivalent topography to Simox can be used for critical applications, but require different processes to produce the structures.

To fabricate using a Simox wafer the torsional scanner 30 or other similar structure in which a dynamic member is supported by torsion bars from a reference member, cavities and masses are first formed by etching through the silicon wafer 146 of the substrate using standard anisotropic (or crystalline) etchants, such as ethylene diamine/pyrocatechol/water ("EDP" or "EPW") or potassium hydroxide/water ("KOH"). This etch through the silicon wafer 146 stops naturally at the oxide layer 144. If necessary, edge compensation can be used to protect the convex corners of the mirror plate 32 or frame 36, if any are present. Etching of corners is not critical in many applications, however certain structures such as rate gyros require that all corners be etched symmetrically to preserve symmetry of oscillating masses.

After completing the etch which goes through the silicon wafer 146, i.e. the bulk of the wafer substrate, the device layer 142 of the substrate is patterned to define the mirror plate 32, torsion bars 34 and frame 36. The mask used to pattern the device layer 142 is aligned with the cavities and masses formed in the silicon wafer 146 using a two-sided aligner. The torsion bars 34 are preferably aligned in the <110> direction for an n-type device layer 142 or the <100> direction for a p-type device layer 142. These orientations are not only optimal for shear stress, but these orientations are nearly insensitive to uniaxial strains. The device layer 142 is then etched from the front to form the mirror plate 32, torsion bars 34 and frame 36. Etching of the device layer 142 can be done with an RIE chlorine etch, or again using an anisotropic wet etch. A RIE chlorine etch is particularly advantageous since that process produces straight walled torsion bars, but any of several other RIE etch chemistries can be used with good results. Use of an anisotropic etchant produces torsion bars 34 having a trapezoidal cross-section. The portions of the oxide layer 144 exposed through the device layer 142 are then removed, leaving free-standing the masses of the mirror plate 32 and the frame 36 together with the torsion bars 34. After removing the oxide layer 144, thin layers of metal or dielectric can be coated onto the mirror plate 32 to enhance reflectivity as described previously in connection with FIG. 2d.

The mirror plate 32 or a frame-shaped dynamic member as required for a rate gyro can be formed to have either the full thickness of the starting silicon-on-insulator wafer, or alternatively, only the thickness of the device layer 142. No mass needs to be plated onto the mirror plate 32 or other dynamic member, the silicon material itself can be sculpted to provide sufficient mass. As described above, under appropriate circumstances the silicon wafer 146 can be mostly etched away producing a box frame structure. The etching process steps set forth above may be reversed if so desired.

If fabrication tolerances are critical, an alternative to using a silicon-on-insulator wafer is the well-known electrochemical etch stop technique. In this method, an n-type layer is epitaxially grown on a p-type substrate. By applying a voltage to the n-layer during the etch, it is possible to etch the p-type substrate without etching the n-layer (see ref.). This method can be used to make n-type membranes of precisely determined thickness, which can then be patterned and etched to form the dynamic member mirror plate 32, the reference member frame 36, and the torsion bars 34.

Another substrate that may be use advantageously for fabricating the torsional scanner 30 is assembled by bonding together two <100> oriented silicon wafers which are rotated with respect to each other. As illustrated in FIG. 8, a bottom silicon wafer 148 may be oriented at 45° with respect to a top silicon wafer 149 during bonding. Orienting the two silicon wafers at 45° with respect to each other causes the <110> crystallographic direction of one wafer to coincide with the <100> crystallographic direction of the other wafer. This allows etching along the <110> direction in one silicon wafer to coincide with etching along the <100> direction in the other silicon wafer, and thereby matches rectangular shapes.

Bonded wafer substrates are particularly advantageous for making membrane mirrors, such as the mirror plate 32, if most of the mirror is a very flat membrane, possibly only a few microns thick, formed in the top silicon wafer 149. The mirror plate 32 may be supported at it periphery by a thicker box frame of silicon from the bottom silicon wafer 148 which is oriented either along the <100> direction or <110> direction. Such membrane mirrors are very light weight but exhibit high stiffness. A rib formed on the mirror plate 32 along the longitudinal axis 52 of the torsion bars 34 passing through the mirror plate 32 and about which the mirror plate 32 rotates may be used to reinforce the mirror plate 32 without increasing the moment of inertia appreciably. A gridwork of such ribs may be used if desired.

Other crystallographic orientations for the wafers being bonded together are possible. For example the top silicon wafer 149 could have <100> orientation, and the bottom silicon wafer 148 have <110> orientation or visa versa, which offers the possibility of much more flexible structures. If the bottom silicon wafer 148 and the top silicon wafer 149 have different orientations, the wafers 148 and 149 may or may not be rotated with respect to each other during bonding.

As a less expensive and easier alternative to using a substrate having an etch stop layer, a plain silicon substrate can be time etched from one side to concurrently form the cavities and masses in the silicon wafer 146 together with membranes having the thickness desired for the torsion bars 34. Membranes formed by timed etching can then be patterned and etched as described above to form the mirror plate 32, the frame 36, and the torsion bars 34. It has been found experimentally that a timed etch in a temperature controlled bath containing 25–40% KOH in water, or other suitable etchant such as TMAH, can be used effectively to form cavities and masses 400 microns deep with a uniformity of $\mp 2$ micron over an entire wafer's surface. It is convenient to perform the RIE etching which defines the mirror plate 32, the frame 36, and the torsion bars 34 after the deep etching of the silicon wafer 146 which forms the cavities and masses. Having the anisotropically etched membranes formed prior to defining the mirror plate 32, the frame 36, and the torsion bars 34 allows the use of a wide variety of RIE etch processes, which, for example, do not have to exhibit good etch rate uniformity across the silicon substrate since the membranes, and therefore the mirror plate 32 and the torsion bars 34, have the thickness obtained in fabricating the membranes which is substantially independent of the subsequent RIE processing.

If at least one of the torsion bars 34 is to include the torsion sensor 102, then before etching the silicon wafer 146, the current electrodes 116 and 118 and output electrodes 132 and 134 are defined by photolithography, aligned with the longitudinal axis 52 of the torsion bar 34 as depicted in FIGS. 3a and 3b. Material forming the electrodes 116, 118, 132 and 134 is then deposited and annealed in place as is well known in the art using for example gold. Gold readily withstands the etchants used subsequently in forming the mirror plate 32, torsion bars 34 and the frame 36. The electrodes 116, 118, 132 and 134 for the torsion sensor 102 are made before any deep etching of the device layer 142 to avoid a subsequent need to pattern the device layer 142 due to difficulty with photoresist coating over large steps in a substrate surface such as those created by the gaps 38. As depicted in FIGS. 3a and 3b, each of the electrodes 116, 118, 132 and 134 has a respective lead 112, 114, 126 or 128 connecting the electrodes 116, 118, 132 and 134 respectively to the pads 106, 108, 122 and 124. The lead 112, 114, 126 or 128 may either be provided by a metallic layer deposited onto the torsion bar 34 and the frame 36, or by highly doped regions in the silicon forming the torsion bar 34 and the frame 36.

2D Torsional Scanner

The process described above for fabricating the one dimensional ("1D) torsional scanner 30 may also be used for fabricating a torsional scanner 152, illustrated in FIGS. 5a, 5b, 5c and 5d, for deflecting a beam of light into a two dimensional ("2D") raster. The 2D torsional scanner 152 includes a first dynamic member which is an oscillating frame 154. Similar to the dynamic member mirror plate 32 of the 1D torsional scanner 30, torsion bars 34a couple the reference member frame 36 to the oscillating frame 154 for rotation about the longitudinal axis 52a of the torsion bars 34a. A second pair of diametrically opposed, axially aligned torsion bars 34b having a longitudinal axis 52b oriented orthogonally to the longitudinal axis 52a of the torsion bars 34a project inward from the oscillating frame 154. The torsion bars 34b couple the oscillating frame 154 to a mirror plate 156 to permit rotation of the mirror plate 156 about the longitudinal axis 52b of the torsion bars 34b. This nonparallel arrangement of the torsion bars 34a and 34b permits concurrent motion of the mirror plate 156 in two directions.

The vibrational modes of the mirror plate 156 and torsion bars 34b are designed as described above so the vibrational frequency of the principal torsional vibrational mode of the mirror plate 156 is lower by at least 20% than the vibrational frequency of any other vibrational mode of the mirror plate 156. Similarly, the torsion bars 34a and the oscillating frame 154, which carries the torsion bars 34b and the mirror plate 156, are also designed so the vibrational frequency of the principal torsional vibrational mode of the oscillating frame 154 is lower by at least 20% than the vibrational frequency of any other vibrational mode of the oscillating frame 154. FIG. 6 illustrates the vibrational frequencies for modes 1–4 for the oscillating frame 154 of a particular 2D torsional scanner 152 where a dashed line 158 crosses the vertical mode lines 1–4 indicated by boxes. Similarly, the vibrational frequencies for modes 1–4 for the mirror plate 156 occur where a solid line 159 crosses the mode lines indicated by circles in FIG. 6. Moreover, as illustrated graphically in FIG. 6 for the 2D torsional scanner 152 a pre-established oscillation frequency for the mirror plate 156 at the vibrational frequency of the principal torsional vibrational mode must differ from the vibrational frequency of the vertical rocking vibrational mode, mode 3, of the oscillating frame 154 by at least 20%, and must differ from the vibrational frequency for all vibrational modes of the oscillating frame 154 other than the vertical rocking vibrational mode by at least 10%.

However, the preceding considerations regarding the relationship existing between the operating frequency of the mirror plate 156 and the vibrational frequencies of vibrational modes of the oscillating frame 154 do not apply to all devices in accordance with the present invention in which a reference member supports a first dynamic member, such as the oscillating frame 154, which in turn supports a second dynamic member, such as the mirror plate 156. For example, as described in the Rate Gyro patent proper operation of a rate gyro requires that the oscillation frequency of one of the dynamic members should be the same as the vibrational frequency for the principal torsional vibrational mode of the other dynamic member.

In one embodiment of the 2D torsional scanner 152, the mirror plate 156 is 3 millimeters ("mm") wide by 3 mm high with a thickness of 300 microns while the torsion bars 34b are 45 microns thick, 70 microns wide, and 2 mm long. The mechanical resonant frequency of this mirror plate 156 for oscillatory rotation about the longitudinal axis 52b is approximately 900 Hz, and the oscillating mirror plate 156 exhibits a Q of approximately 1000 when oscillating at normal atmospheric pressure. As depicted in FIGS. 5b–5d, the mirror plate 156 is merely a solid flat plate. However, if desired a lighter but sufficiently stiff mirror plate 156 can be fabricated by thinning the center of the mirror plate 156 while leaving a hollow box frame that encircles the perimeter of the mirror plate 156.

The oscillating frame 154 is 8 mm high by 6 mm wide, has a width of 1 mm and a thickness of 300 microns. The torsion bars 34a are 1 mm long, 45 microns thick, and approximately 90 microns wide. As depicted in FIGS. 5b–5d, the oscillating frame 154 is merely a solid flat frame. However, if desired a lighter but sufficiently stiff oscillating frame 154 can be fabricated by thinning the outer portion of the oscillating frame 154 while leaving a hollow box frame that encircles the inner perimeter of the oscillating frame 154. The mechanical resonant frequency of the oscillating frame 154 for oscillatory rotation about the longitudinal axis 52a (including the inertia of the mirror plate 156) is approximately 240 Hz, and preferably has a low Q.

The 2D torsional scanner 152 is secured to an insulating substrate 162 made from alumina, ceramic, glass etc. that supports the frame 36 of the 2D torsional scanner 152. An insulating spacer 164, screen printed or otherwise formed on the insulating substrate 162, separates the frame 36 from the insulating substrate 162. The separation established by the insulating spacer 164 permits concurrent angular rotation of mirror plate 156 about both the longitudinal axis 52a and the longitudinal axis 52b.

As best illustrated in FIG. 5d, permanent magnets 172 are disposed along diametrically opposed edges of the sandwitched frame 36, insulating substrate 162 and insulating spacer 164. The permanent magnets 172 establish a magnetic B field across the 2D torsional scanner 152, illustrated in FIG. 5d by arrows 174, of a few thousand Gauss. The permanent magnets 172 may be metallic, ceramic or plastic magnets, of the Neodymium Boron or other types.

As illustrated in FIG. 5a, a coil 182 plated onto the oscillating frame 154 encircles its periphery. A pair of electrical contacts 184, located on the frame 36, connect to the coil 182 via leads 186 which are brought in over one of the torsion bars 34a. An electrical current of tens of milliamperes ("mA") coupled into the coil 182 through the electrical contacts 184 combined with the magnetic field established by the permanent magnets 172 produces an angular rotation of the oscillating frame 154 with respect to the frame 36 about the longitudinal axis 52a of several degrees.

A pair of rectangularly-shaped apertures 192 pierce the insulating substrate 162 beneath that portion of the oscillating frame 154 furthest from the torsion bars 34a. Small shock-absorbing pads 194 are screen-printed onto a surface of the insulating substrate 162 immediately adjacent to each of the apertures 192 beneath the oscillating frame 154 and near the torsion bars 34a to absorb impact shock should the oscillating frame 154 strike the insulating substrate 162. The apertures 192 permit the oscillating frame 154 to rotate through a larger angle than would be allowed merely by the separation between the oscillating frame 154 and the insulating substrate 162 established by the insulating spacer 164. Since the oscillating frame 154 is substantially larger than the mirror plate 156, for identical angular rotations the arcuate displacement of the oscillating frame 154 furthest from the torsion bars 34a is proportionally larger than a corresponding displacement of the mirror plate 156. Accordingly, the apertures 192 permit an advantageously close spacing of the mirror plate 156 to the insulating substrate 162 while allowing adequate rotation for the oscillating frame 154.

As best depicted in FIGS. 5a and 5b, the insulating substrate 162 also carries screen-printed, electrically conductive electrostatic drive electrodes 46 immediately adjacent to the mirror plate 156. When the mirror plate 156 is stationary, the separation between the electrodes 46 and the immediately adjacent surface of the mirror plate 156 is approximately 100–150 microns. Electrically conductive leads 202, that are disposed on the surface of the insulating substrate 162, pass beneath the insulating spacer 164 to connect the electrodes 46 to electrical contacts 204 that are also disposed on the insulating substrate 162. The electrical contacts 204 permit applying an oscillatory electrostatic driving voltage between the mirror plate 156 and the electrodes 46. The preceding configuration for the 2D torsional scanner 152 and the insulating substrate 162 and the Q of the mirror plate 156 permits a one-hundred (100) volt ("V") alternating current ("AC") driving potential at the vibrational frequency of the principal torsional vibrational mode of the mirror plate 156 to apply a force which deflects the mirror plate 156 approximately plus-and-minus six ($\mp 6$) degrees.

FIG. 9a–9c depict the torsional scanner 30 with the silicon wafer 146 about the center of mass of the mirror plate 32 mostly etched away producing a box frame structure 222 surrounding the periphery of the mirror plate 32 thereby reinforcing a thinner membrane which provides most of the surface area of the mirror plate 32. As illustrated in FIGS. 9b and 9c, for particular applications in which magnetic force urges the mirror plate 32 or 156, or the oscillating frame 154 to rotate about the longitudinal axis 52 of the torsion bars 34, the coil 182 may be provided by an appliqué 224 depicted both in FIG. 9b and 9c. The appliqué 224 includes the coil 182 formed by a metallic conductor material disposed on a sheet of polymeric material, such as polyimide, that is adhesively bonded onto the box frame structure 222. The polymeric material may be 1 mil thick and have a 1 mil copper foil bonded thereon. Large electric currents may then flow through the copper coil 182 on the appliqué 224. Though not depicted in FIGS. 9a–9c, the leads 186 for the coil 182 are brought out immediately beneath the torsion bars 34 to reduce flexure of the leads 186 and any resistance to rotation of the mirror plate 32 by the leads 186.

In the illustration of FIG. 9b, the appliqué 224 is flat and attached to the box frame structure 222 distal from the mirror plate 32. The appliqué 224 can also be made so it slips over and around the box frame structure 222 as illustrated in FIG. 9c. In that illustration, the appliqué 224 stands on edge so to speak, and has a height equal to that of the box frame structure 222. As illustrated in FIG. 9c, the appliqué 224 can be wound around the box frame structure 222 several times if necessary. Alternatively, if necessary a small rectangular standard wire wound coil may be attached to the mirror plate 32 in this way instead of the appliqué 224. In either of these two latter approaches, again the leads 186 are brought out adjacent to the torsion bars 34 to reduce both flexure of the leads 186 and any resistance to rotation of the mirror plate 32 by the leads 186.

As described above, the 2D torsional scanner 152 employs electrostatic force for rotating the mirror plate 156 about the longitudinal axis 52b of the torsion bars 34b, and magnetic force for rotating the oscillating frame 154 about the longitudinal axis 52a of the torsion bars 34a. To continuously sense the positions of the mirror plate 156 with respect to the oscillating frame 154 and the oscillating frame 154 with respect to the frame 36, each pair of torsion bars 34a and 34b may include a torsion sensor 102. FIG. 7 is a plan view illustrating the presently preferred embodiment of the silicon 2D torsional scanner 152 omitting the insulating substrate 162 and permanent magnets 172. Those elements depicted in FIG. 7 that are common to the 2D torsional scanner 152 depicted in FIGS. 5a, 5b, 5c and 5d carry the same reference numeral distinguished by a prime ("'") designation. The 2D torsional scanner 152 depicted in FIG. 7 differs from the 2D torsional scanner 152 depicted in FIGS. 5a through 5d in the following ways.

First, as depicted in FIG. 7 the oscillating frame 154' is "butterfly shaped." Frequently the area required for the mirror plate 32 or 156 is rather small. Perhaps only a 1 mm square mirror plate 32 or 156 is all that is required. The small mirror plate 32 or 156 is then very light.

The butterfly shape depicted in FIG. 7 increases the mass of the mirror plate 32 or 156 or the oscillating frame 154 while concurrently permitting both long torsion bars 34 and providing a large moment of inertia without increasing the area required on the silicon substrate. Hence, using the butterfly shape for the mirror plate 32 or 156 or the oscillating frame 154 yields more torsional scanners 30 from a silicon substrate and the manufacturing cost per torsional scanner 30 correspondingly decreases. The butterfly shaped design can be used for fabricating the mirror plate 32 or 156 or the oscillating frame 154 either with or without a micromachined box frame reinforcing the periphery of the mirror plate 32 or 156 or the oscillating frame 154.

The increase in area of the mirror plate 32 or 156 or the oscillating frame 154 provided by the butterfly shape also permits larger electrostatic or electromagnetic forces to be applied to the mirror plate 32 or 156 or the oscillating frame 154. Applying larger forces to the mirror plate 32 or 156 or the oscillating frame 154 decreases the driving voltages or currents needed to achieve a particular angular rotation. This is particularly important for designs which employ electrostatic drive where the forces are inherently low.

The butterfly-shaped oscillating frame 154 or mirror plate 156 or 32 has a lesser width $W_1$ between junctions 206 at which the torsion bars 34 couple to the dynamic member oscillating frame 154 or mirror plate 156 or 32 than a width $W_2$ along a line 208 that is parallel to the longitudinal axis 52 collinear with the torsion bars 34 but displaced from the torsion bars 34. Furthermore, the butterfly-shaped oscillating frame 154 or mirror plate 156 or 32 more completely fills the area within the inner perimeter of the surrounding frame 36 or oscillating frame 154 leaving only a narrow gap 38 between the inner perimeter of the frame 36 or oscillating frame 154 and the outer perimeter of the oscillating frame 154 or mirror plate 156. The presence of the narrow gap 38' increases pneumatic damping of the rotation of the oscillating frame 154' about the longitudinal axis 52', and correspondingly reduces the Q of the oscillating frame 154'. Narrowing or widening the gap 38' varies the amount of the pneumatic damping as well as the amount of the Q reduction.

In one embodiment the butterfly shaped oscillating frame 154' surrounds and supports through the torsion bars 34' a 1500 micron×1500 micron mirror plate 156' that is 300 microns thick. Supported by torsion bars 34' that are 40 microns thick, 50 microns wide and 500 microns long, the mirror plate 156' has a mechanical resonant frequency of 5000 Hz. The outer perimeter of the 300 micron thick oscillating frame 154' measures 4500 microns along the shorter sides and 6000 microns along the longer sides. The torsion bars 34' are 40 microns thick, 80 microns wide, and 1,000 microns long. The oscillating frame 154' may be formed with a thicker reinforcing frame around its inner perimeter to rigidly support the torsion bars 34' and the mirror plate 156' within the oscillating frame 154'.

Second, the 2D torsional scanner 152' employs a multi-turn, spiral coil 182'. The 2D torsional scanner 152' in connecting one end of the coil 182' to one of the electrical contacts 184', employs an electrical insulating layer 212 separating the coil 182' from the lead 186' where one of the leads 186' crosses over the coil 182'. As with the 2D torsional scanner 152 depicted in FIG. 5a and 5b, a pair of electrical contacts 184' located on the oscillating frame 154' permit supplying an electric current up to approximately 150 mA to the coil 182' for rotating the oscillating frame 154' about the longitudinal axis 52a'.

Lastly, the presently preferred 2D torsional scanner 152' includes a pair of torsion sensors 102', one of which is located on one of the torsion bars 34a', and the other of which is located on one of the torsion bars 34b'. To respectively supply current to and receive a voltage from the pair of torsion sensors 102a' and 102b', the 2D torsional scanner 152' includes two sets of current pads 104 and 106 and output pads 122 and 124 respectively denominated "a" and "b" in FIG. 7. Similar to the electrical insulating layer 212 described above, the leads connecting the torsion sensor 102' that is located on one of the torsion bars 34b' are insulated from the coil 182' by an electrical insulating layer 214 where hose leads cross over the coil 182' before crossing over the torsion bar 34a' in connecting to the appropriate current pads 104 and 106 and output pads 122 and 124. In all other pertinent aspects, the torsion sensors 102' are identical to the torsion sensor 102 described above and depicted in FIGS. 3a and 3b.

While the mirror plate 32 or 156 and the oscillating frame 154 when fabricated in the manner described above are stress free and very flat, depositing the coil 182' depicted in FIG. 7 onto one side of the oscillating frame 154 can significantly increase stress in that structure. If a coil 182 such as that depicted in FIG. 7 were deposited onto the mirror plate 32 or 156, the increased stress might cause the mirror plate 32 or 156 to curl thereby destroying its usefulness for deflecting an optical beam.

FIG. 10 depicts a torsional scanner 30 in which the mirror plate 32 includes, for example, four (4) flexures 232 which couple to and support a stress free central plate 234 to a surrounding central-plate support-frame 236 which carries the coil 182. Supported by the flexures 232 from the central-plate support-frame 236, the central plate 234 exhibits a plurality of vibrational modes with respect to the central-plate support-frame 236. However, the flexures 232 are designed so that all of the vibrational modes of the central plate 234 with respect to the central-plate support-frame 236 have a vibrational frequency much higher than a frequency at which the mirror plate 32 is driven to rotate back-and-forth about the longitudinal axis 52 of the torsion bars 34 by an electric current flowing through the coil 182. In this way the central plate 234 supported by the flexures 232 from the central-plate support-frame 236 move in unison responsive to the rotary motion imparted to the mirror plate 32 by a magnetic force resulting from electric current flowing through the coil 182. However, even though the flexures 232 are stiff enough to cause the central plate 234 and central-plate support-frame 236 to move in unison, flexures 232 are sufficiently flexible that they decouple any stress induced in the central-plate support-frame 236 by the coil 182 so the central plate 234 remains essentially stress free and flat thereby preserving the outstanding optical properties inherently possessed by the torsional scanner 30. Other flexure structures may be devised which differ from those depicted in FIG. 10 but which achieve the same result.

As described in greater detail below, structures the same as or similar to the 2D torsional scanner 152 may be used as an optical alignment mechanism for a beam of light, providing stationary, or quasi stationary positioning along two axes, or stationary or quasi-stationary motion along one axis with periodic motion (sinusoidal, linear) or tracking motion along the other axis, or tracking along two axes to keep a beam on target.

Optical Alignment

FIG. 11a and 11b depict a U-shaped support structure 242 for supporting the torsional scanner 30 that permits mechanically adjusting the orientation of the torsional scanner 30 with respect to other structures. The support structure 242 is coupled to the frame 36 of the torsional scanner 30 by a pair of pair of diametrically opposed, axially aligned torsion bars 34a projecting from the support structure 242. As described in greater detail below, the support structure 242 and the torsion bars 34a are monolithically fabricated from the silicon substrate together with the frame 36, the torsion bars 34b and the mirror plate 32 included in the torsional scanner 30. As illustrated in FIG. 11b, the frame 36 carries electrodes 46 for applying electrostatic force urging the mirror plate 32 to rotate about the longitudinal axis 52 of the torsion bars 34b. The leads 202 for applying a voltage to the electrodes 46 cross between the frame 36 and the support structure 242 via the torsion bars 34a. The support structure 242 may be open at one end as illustrated in FIG. 11b, because the arms 243 of the support structure 242 are made strong enough not to deform as the frame 36 rotates about the longitudinal axis 52a of the torsion bars 34a, and therefore the support structure 242 keeps the torsion bars 34a and the frame 36 stress free.

In the illustration of FIGS. 11a and 11b, the support structure 242 is bonded onto a silicon block 244 having a V-shaped groove 246 formed therein as indicated by dashed lines in those Figures While in the illustration of FIGS. 11a and 11b the support structure 242 receives an optical fiber 248, in principal the silicon block 244 may carry any type of optical component such as lenses, mirrors, etc. For the torsional scanner 30 depicted in FIGS. 11a and 11b, a beam of light 249 emitted from the optical fiber 248 impinges either upon the backside of the silicon wafer 146 furthest from the device layer 142 or upon the backside of the device layer 142 depending upon precise details of the configuration of the mirror plate 32 described in greater detail below.

Referring now to FIGS. 12a–12f, as micromachined from the silicon substrate the frame 36, mirror plate 32 and support structure 242 may utilize the full thickness of the substrate as depicted in FIG. 12b. Alternatively, the mirror plate 32 may have the thickness of the device layer 142 as depicted in FIG. 12d, or both the mirror plate 32 and the frame 36 may have the thickness of the device layer 142 as depicted in FIG. 12e. Alternatively, the mirror plate 32 may be formed with the box frame structure 222 as illustrated in FIG. 12c.

For some applications requiring extremely high frequency movement of the mirror plate 32, it is possible that mirror plate 32 and or torsion bars 34b may need to be thinner than the device layer 142 which typically has the thickness of torsion bars 34a. Under such circumstances, as illustrated in FIG. 12f, a central region 252 of the mirror plate 32 may be etched, isotopically, but preferably anisotropically, so the torsion bars 34b and mirror plate 32 are thinner than the device layer 142, which defines the thickness of torsion bars 34a. (In FIG. 12f the thickness of the device layer 142 is greatly exaggerated for illustrative purposes.) Since the device layer 142 lacks a built-in etch stop, etching the central region 252 is typically done first with a timed etch as described above. Etching the central region 252 is performed from the top of the wafer substrate, and thus often destroys the mirror surface on the front of the device layer 142. After the etching the central region 252, the front surface is reoxidized and the remainder of the torsional scanner 30 including the support structure 242 is micromachined as described above. In this way the back of the mirror plate 32 retains a very good optical surface, extremely flat with very low surface scattering.

For the support structure 242, as illustrated in FIG. 13 the longitudinal axis 52a of the torsion bar 34a need not pass through the mirror plate 32. When the longitudinal axis 52a does not pass through the center of the mirror plate 32, then rotation of the frame 36 about the longitudinal axis 52a translates the mirror plate 32, or any other optical component (e.g. lens, diffraction grating etc.) located on the mirror plate 32 with respect to other optical elements mounted in the silicon block 244. Such movement of the mirror plate 32 with respect to the silicon block 244 may be used for focusing, or other translational adjustments as desired.

Rotation around the longitudinal axis 52a or 52b of either pair of torsion bars 34a or 34b may be done either electrostatically, or electromagnetically as described previously. The mirror plate 32 and frame 36 may also be held or rotated into a desired angular position using push rods or other mechanical devices, connected to small actuators. As described above, rotation from equilibrium about the longitudinal axis 52a and/or 52b of either pair of torsion bars 34a and 34b may be measured with torsion sensors 102 incorporated into the torsion bars 34a and 34b. For some applications, rotation about the longitudinal axis 52a or 52b may be fixed after assembly of the support structure 242 together with the silicon block 244 and associated optical components. In this way the mirror plate 32 as coupled to the frame 36 is disposed at a pre-established angle with respect to the support structure 242 and locked at that pre-established angle.

As depicted in FIG. 14, the electrodes 46 may be carried by frame 36. The electrodes 46 may be plated or evaporated over the frame 36 and the mirror plate 32 on top of a suitable spacer, such as photoresist, which is subsequently removed after forming the electrodes 46. Stress free oxy-nitrides may also be used as a spacer during formation of the electrodes 46. In fact any material which is selectively etched in comparison with silicon may be used for the spacer. The plating or evaporation is done in such a way that electrodes 46 become freely suspended over the mirror plate 32, but are supported mechanically from the frame 36. To this end, thinning the mirror plate 32 at the central region 252 as described above in connection with FIG. 12f provides a very advantageous geometry for fabricating the electrodes 46, and provides a natural depression to be filled with photoresist or any other filler. The electrodes 46 may be pierced by holes 256 to reduce squeeze flow damping of rotation of the mirror plate 32 about the longitudinal axis 52b of the torsion bars 34b. The leads 202 to the electrodes 46, suitably insulated, are carried over the torsion bars 34a to contacts on support structure 242 (Not depicted in any of the Figures).

In forming the electrodes 46 over the mirror plate 32 and the frame 36, the wafer substrate is processed as described above but forming the cavities and masses in the silicon wafer 146 is postponed. A spacing layer is deposited over the device layer 142 to provide a base which the electrodes 46 may be formed. This spacing layer is easily formed using a photoimageable polyimide which can be applied by spin coating. After drying, the polyimide can be exposed and developed like a photoresist. Polyimide is particularly appropriate as it dries very slowly at room temperature when applied in thick layers (5 to 10 microns), and thus flows over the surface of the substrate and provides a smooth and planar surface for patterning. The polyimide is imaged to create the spacer over the mirror plate 32, the frame 36 and in any other areas desired, for instance over torsion bars 34b. The spacer layer is left intact at any location where the electrodes 46 should not touch the device layer 142.

The electrodes 46 are then created by depositing a seed layer of the desired metal, in this case an evaporated layer of 100 A° of chromium and 2000 A° of gold. Photoresist (typically AZ4620 with a thickness of 6 to 18 microns) is used to define the shape of the electrodes 46, and of the leads 202 which bring the driving signal to the electrodes 46. Using the photoresist as a mold, the electrodes 46 are created by plating the desired metal (in this case gold) to the desired thickness (in this case from 1 to 10 microns) such that the electrodes 46 will be self-supporting once the spacer layer is removed. The photoresist is then removed and the seed layer is also removed using common metal enchants, or by ion milling or sputter etching.

The spacer layer can now be removed using wet chemical strippers, or an oxygen plasma. To facilitate removal, the holes 256 piercing the electrodes 46 allows the stripping agent to more easily reach the spacer layer. The electrodes 46 now being complete, the mirror assemblies can now be completed by etching the cavities and masses into the silicon wafer 146 as described above.

As disclosed in the Torsional Scanner patent, the mirror plate 32 may contain a photodetector, preferably along its periphery, to monitor e.g. reflected light. This type of detector may also be mounted on the frame 36. The mirror plate 32 may be used as a mirror proper or as a detector, or as a support for a transmissive or reflective Fresnel lens (or other micro lens) or a diffraction grating deposited on the plate, as a beam splitter, pinhole etc. or all of the above. The frame 36 may contain an etched hole for some of these purposes.

Although the present invention has been described in terms of the presently preferred embodiment, it is to be understood that such disclosure is purely illustrative and is not to be interpreted as limiting. Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. An integrated, micromachined structure comprising:
    a reference member;
    a first pair of diametrically opposed, axially aligned torsion bars projecting from said reference member;
    a first dynamic member that is coupled by said first pair of torsion bars to said reference member to be thereby supported from said reference member for rotation about a first axis that is collinear with said first pair of torsion bars; said reference member, said first pair of torsion bars and said first dynamic member all monolithically fabricated from a stress-free semiconductor layer of a silicon substrate; said first dynamic member thus supported within said reference member by said first pair of torsion bars, said first dynamic member:
    having a center;
    defining a first dynamic member rest plane if no external force is applied to said first dynamic member; and
    exhibiting a plurality of vibrational modes including a principal torsional vibrational mode about the first axis that is collinear with said first pair of torsion bars, a vertical shaking vibrational mode, a vertical rocking vibrational mode, a lateral shaking vibrational mode, and a lateral rocking vibrational mode, each vibrational mode of said first dynamic member having a vibrational frequency, the vibrational frequency of the principal torsional vibrational mode being lower by at least 20% than the vibrational frequency of any other vibrational mode of said first dynamic member; and
    first drive means for imparting rotary motion to said first dynamic member about the first axis that is collinear with said first pair of torsion bars.

2. The structure of claim 1 wherein said drive means comprises at least a pair of electrodes spaced apart from said first dynamic member, the electrodes being displaced from said first pair of torsion bars.

3. The structure of claim 1 wherein said drive means comprises:
    means for applying a magnetic field substantially parallel to the rest plane of said first dynamic member; and
    a coil means disposed on said first dynamic member and in the magnetic field.

4. The structure of claim 3 wherein said coil means is formed by a layer of metallic material coated directly onto said first dynamic member.

5. The structure of claim 3 wherein said coil means is formed by a layer of metallic material disposed on a sheet of polymeric material that is adhesively bonded onto said first dynamic member.

6. The structure of claim 1 wherein said semiconductor layer is in a silicon-on-insulator wafer substrate.

7. The structure of claim 1 wherein said semiconductor layer is in a silicon substrate assembled by bonding together two silicon wafers, each of the silicon wafers having both a <100> crystallographic direction and a <110> crystallographic direction, the two silicon wafers being oriented with respect to each other so the <110> crystallographic direction of one wafer coincides with the <100> crystallographic direction of the other wafer.

8. The structure of claim 1 further comprising torsion sensing means disposed on one of said first pair of torsion bars for generating a torsion signal that indicates angular deflection of said first dynamic member with respect to said reference member.

9. The structure of claim 8 wherein said torsion sensing means comprises at least three electrical contacts on the one of said first pair of torsion bars, and means for applying an electric current across at least a pair of said electrical contacts, and the torsion signal is sensed from a pair of said electrical contacts.

10. The structure of claim 9 wherein the electric current is applied across the pair of electrical contacts and the torsion signal sensed from the pair of electrical contacts via metallic conductors disposed on the semiconductor layer.

11. The structure of claim 9 wherein the electric current is applied across the pair of electrical contacts and the torsion signal sensed from the pair of electrical contacts via conductive paths established within the semiconductor layer.

12. The structure of claim 9 wherein said torsion sensing means comprises:
    at least four electrical contacts disposed on the one of said first pair of torsion bars with a pair of said electrical contacts being disposed along a line that is oriented substantially parallel to the first axis collinear with said first pair of torsion bars; and means for applying an electric current across a first pair of said electrical contacts while the torsion signal is sensed from a second pair of said electrical contacts oriented perpendicular to a line joining the first pair of said electrical contacts.

13. The structure of claim 12 wherein the electric current is applied across the first pair of electrical contacts and the torsion signal sensed from the second pair of electrical contacts via metallic conductors disposed on the semiconductor layer.

14. The structure of claim 12 wherein the electric current is applied across the first pair of electrical contacts and the torsion signal sensed from the second pair of electrical contacts via conductive paths established within the semiconductor layer.

15. The structure of claim 1 wherein said substrate is a silicon material which has both a <100> crystallographic direction and a <110> crystallographic direction, and said first pair of torsion bars are oriented in the <110> crystallographic direction for an n-type silicon layer.

16. The structure of claim 1 wherein said substrate is a silicon material which has both a <100> crystallographic direction and a <110> crystallographic direction, and said first pair of torsion bars are oriented in the <100> crystallographic direction for a p-type silicon layer.

17. The structure of claim 1 wherein said first dynamic member includes:
   a frame:
   a second pair of diametrically opposed, axially aligned torsion bars projecting from said frame, said second pair of torsion bars being oriented non-parallel to the first pair of torsion bars; and
   a second dynamic member that is coupled by said second pair of torsion bars to said first dynamic member to be thereby supported from said first dynamic member for rotation about a second axis that is collinear with said second pair of torsion bars; said second pair of torsion bars and said second dynamic member all monolithically fabricated from the silicon substrate together with said reference member, said first pair of torsion bars and said first dynamic member; said second dynamic member thus supported within said first dynamic member by said second pair of torsion bars, said second dynamic member:
   having a center;
   defining a second dynamic member rest plane if no external force is applied to said second dynamic member; and
   exhibiting a plurality of vibrational modes including a principal torsional vibrational mode about the second axis that is collinear with said second pair of torsion bars, a vertical shaking vibrational mode, a vertical rocking vibrational mode, a lateral shaking vibrational mode, and a lateral rocking vibrational mode, each vibrational mode of said second dynamic member having a vibrational frequency, the vibrational frequency of the principal torsional vibrational mode of said second dynamic member being lower by at least 20% than the vibrational frequency of any other vibrational mode of said second dynamic member.

18. The structure of claim 17 wherein a pre-established oscillation frequency for said second dynamic member:
   differs from the vibrational frequency of the vertical rocking vibrational mode of said first dynamic member by at least 20%; and
   differs from the vibrational frequency for all vibrational modes of said first dynamic member other than the vertical rocking vibrational mode by at least 10%.

19. The structure of claim 17 wherein a pre-established oscillation frequency for said second dynamic member is the same as the vibrational frequency for the principal torsional vibrational mode of said first dynamic member.

20. The structure of claim 17 further comprising second drive means for imparting rotary motion to said second dynamic member about the second axis that is collinear with said second pair of torsion bars.

21. The structure of claim 20 wherein one of said drive means employs electrostatic force, and the other drive means employs magnetic force.

22. The structure of claim 20 wherein said second drive means for imparting rotary motion to said second dynamic member employs electrostatic force, and said first drive means for imparting rotary motion to said first dynamic member employs magnetic force.

23. The structure of claim 1 wherein said first dynamic member is substantially thinner than said reference member.

24. The structure of claim 1 wherein mass around the center of said first dynamic member is mostly etched away.

25. The structure of claim 1 wherein said first dynamic member has front and back sides, and the front side of said first dynamic member has a reflective mirror coating applied thereto.

26. The structure of claim 1 wherein said first dynamic member has front and back sides, and the back side of said first dynamic member has a reflective mirror coating applied thereto.

27. The structure of claim 1 wherein said first dynamic member has front and back sides, and both the front and back sides of said first dynamic member have a reflective mirror coating applied thereto.

28. The structure of claim 1 wherein said first dynamic member has a lesser width between junctions at which the first pair of torsion bars couple to said first dynamic member than along a line that is parallel to the first axis collinear with said first pair of torsion bars but displaced from said first pair of torsion bars.

29. The structure of claim 1 wherein said first dynamic member includes both a plate and a frame that surrounds the plate and to which said first pair of torsion bars couple, the first dynamic member further including flexures that couple the plate to the frame, the plate exhibiting a plurality of vibrational modes with respect to the frame, all of the vibrational modes of the plate with respect to the frame having a vibrational frequency much higher than a frequency at which said drive means imparts rotary motion to said first dynamic member, whereby the frame and the plate move in unison responsive to the rotary motion imparted by said drive means.

30. The structure of claim 1 further comprising:
   a supporting member; and
   a second pair of diametrically opposed, axially aligned torsion bars projecting from said supporting member that couple said supporting member to said reference member; said second pair of torsion bars and said supporting member all monolithically fabricated from the silicon substrate together with said reference member, said first pair of torsion bars and said first dynamic member; and said second pair of torsion bars permitting said reference member to be mechanically rotated about a second axis that is collinear with said second pair of torsion bars and to be locked at an arbitrarily selectable orientation with respect to said supporting member, whereby the first dynamic member coupled to said reference member is disposed at a arbitrarily selectable angle with respect to said supporting member.

* * * * *